United States Patent
Takaishi

[19]

[11] Patent Number: 6,088,187

[45] Date of Patent: Jul. 11, 2000

[54] CONTROL SYSTEM FOR TWO-STAGE ACTUATOR

[75] Inventor: Kazuhiko Takaishi, Kawasaki, Japan

[73] Assignee: Fujitsu Limited, Kawasaki, Japan

[21] Appl. No.: 08/918,379

[22] Filed: Aug. 26, 1997

[30] Foreign Application Priority Data

Mar. 17, 1997 [JP] Japan ................................ 9-063440

[51] Int. Cl.$^7$ .................................................. G11B 5/596
[52] U.S. Cl. ................................... 360/78.05; 360/78.09
[58] Field of Search .......................... 360/78.05, 77.04, 360/78.12, 78.09; 369/32, 44.28; 318/568.17

[56] References Cited

U.S. PATENT DOCUMENTS

| | | | |
|---|---|---|---|
| 5,189,578 | 2/1993 | Mori et al. ........................ | 360/78.05 X |
| 5,452,153 | 9/1995 | Baheri et al. ..................... | 360/78.05 |
| 5,452,275 | 9/1995 | Ogawa ............................. | 360/78.05 X |
| 5,521,778 | 5/1996 | Boutaghou et al. ............... | 360/78.05 X |
| 5,834,864 | 11/1998 | Hesterman et al. .............. | 360/78.05 X |

FOREIGN PATENT DOCUMENTS

| | | |
|---|---|---|
| 0281327 | 3/1990 | Japan . |
| 5266616 | 10/1993 | Japan . |

*Primary Examiner*—Andrew L. Sniezek
*Attorney, Agent, or Firm*—Greer, Burns & Crain, Ltd.

[57] ABSTRACT

A control system for a two-stage actuator for a disk drive, including a coarse actuator having a voice coil motor as a driving device mounted on a base of the disk drive, a microactuator mounted on the coarse actuator and carrying a head at a front end portion, a coarse actuator controller for controlling driving of the coarse actuator, and a microactuator controller for controlling driving of the microactuator. The control system further includes a feedback device for calculating a position error between a target position and an observed position of the head, and inputting the position error into the coarse actuator controller and the microactuator controller. The displacement of the microactuator relative to the coarse actuator is not input into the coarse actuator controller.

10 Claims, 26 Drawing Sheets

F I G. 11
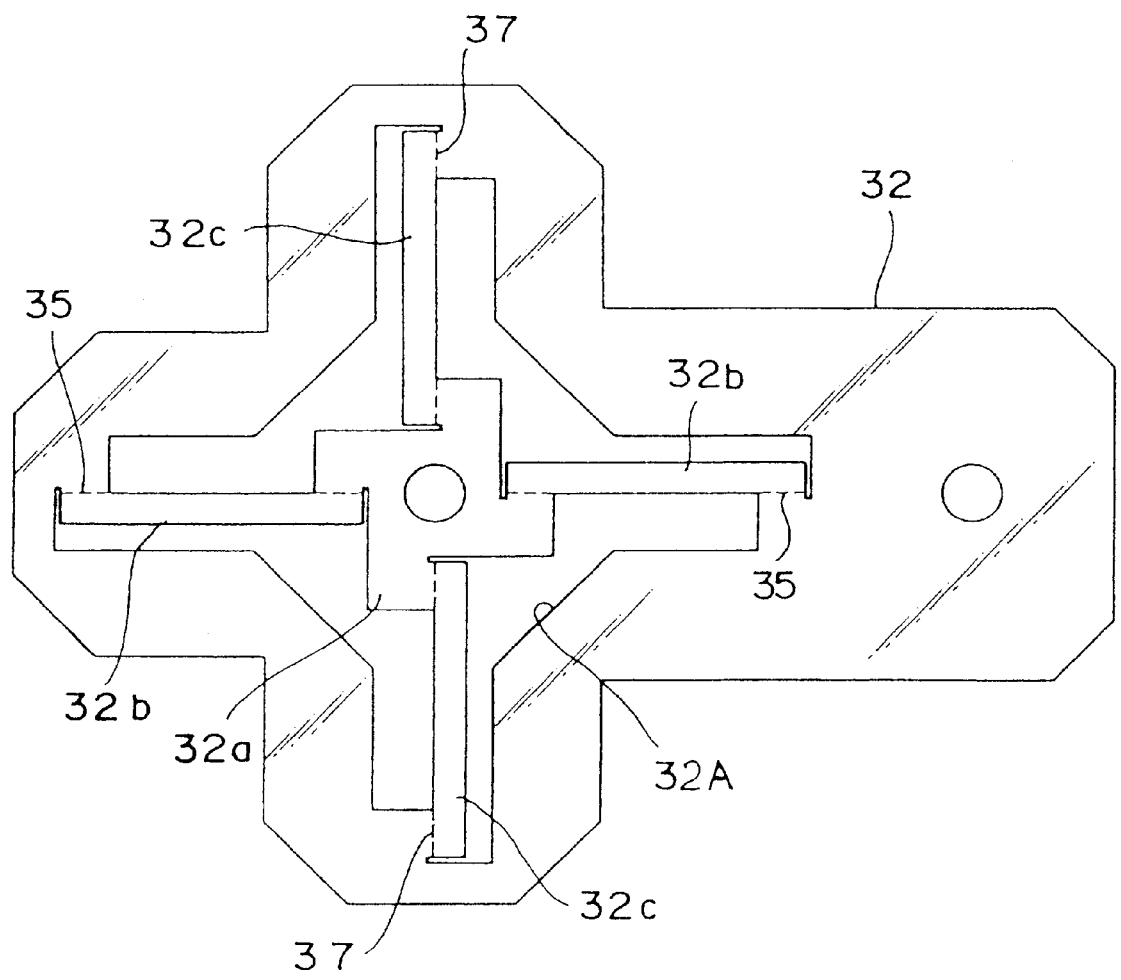

Gm=−12.05dB, (f=772.6Hz) Pm=38.82deg. (f=1953Hz)

Gm=-12.73dB, (f=770.7Hz) Pm=37.38deg. (f=2000Hz)

Gm=−15.24dB, (f=668.6Hz) Pm=39.54deg. (f=2006Hz)

Gm=-11.16dB, (f=311.9Hz) Pm=38.23deg. (f=693Hz)

Gm=-10.65dB, (f=801.8Hz) Pm=26.18deg. (f=1619Hz)

CONTROL SYSTEM FOR TWO-STAGE ACTUATOR

BACKGROUND OF THE INVENTION

1. Field of the Invention

The present invention relates to a control system for a two-stage actuator for a disk drive.

2. Description of the Related Art

Known as an actuator for moving a magnetic head in a magnetic disk drive is a so-called two-stage actuator having a two-stage structure such that a microactuator for slightly moving the magnetic head is mounted on a coarse actuator having a voice coil motor (VCM) as driving means. For driving of such a two-stage actuator, a control system different from a conventional one is required. That is, required is a two-stage actuator control system capable of properly controlling coarse actuator control means and microactuator control means to achieve accurate seek control and tracking control for a magnetic head.

In a conventional magnetic disk drive, an actuator having only a VCM as means for moving a magnetic head is generally used. However, there is a limit in the performance of such an actuator for moving a magnetic head at high speeds across thousands or tens of thousands of tracks in case of intending to perform positioning control (tracking control) for the magnetic head with an accuracy of tenths of a one-track width.

There has been proposed a double actuator having a coarse actuator using a VCM as driving means and a piezoelectric actuator using a piezoelectric element as driving means mounted on the coarse actuator in a magnetic disk drive. Recently, there have also been proposed a microactuator using static electricity instead of the piezoelectric element as driving means and an electromagnetic microactuator having a structure similar to the structure of the VCM.

In driving such two-stage actuators, control means different from a conventional one is required. More specifically, a transfer function of control means given by an automatic control theory must be designed. Since both the coarse actuator and the microactuator must be controlled, two control means are required. The two control means perform positioning control for one magnetic head, so that the relationship between the two control means is important.

FIG. 1 is a block diagram showing a circuit configuration of a magnetic disk drive having a two-stage actuator. A hard disk controller 1 controls an interface 3, and is provided with a cache RAM 5. A microcontroller unit 7 controls individual circuits in the disk drive. A control program is stored in a ROM 9. A read/write circuit 11 controls a magnetic head 13 to read data from a magnetic disk and write data to the magnetic disk. A spindle motor drive circuit 15 controls a spindle motor 21. A VCM drive circuit 23 controls a voice coil motor (VCM) 25. Further, a microactuator drive circuit 39 controls a microactuator 41.

As a control system for such a two-stage actuator, systems as shown in FIGS. 2 and 3 have been proposed. Referring first to FIG. 2, block 44 denotes a microactuator; block 46 denotes a microactuator controller; block 48 denotes a coarse actuator; and block 50 denotes a coarse actuator controller. Further, block 52 denotes a microactuator model using the same expression as that of the microactuator 44. In the microactuator model 52, the displacement of only the microactuator is artificially estimated.

Pm represents a transfer function of the microactuator; Pv a transfer function of the coarse actuator; Cm a transfer function of a compensator for control of the microactuator; and Cv a transfer function of a compensator for control of the coarse actuator. Further, P'm represents an equivalent filter for estimating the displacement of the microactuator; Um a drive value for the microactuator; and Uv a drive value for the coarse actuator.

The microactuator drive value Um is output from the microactuator controller 46, and the microactuator 44 is driven according to the drive value Um. The displacement of the microactuator is estimated from the output from the microactuator controller 46, i.e., from the drive value Um for the microactuator 44. As means for estimating the displacement, a filter having characteristics approximated to the characteristics of the microactuator 44 is used. The estimated displacement of the microactuator is output from the microactuator model 52, and input into the coarse actuator controller 50. The coarse actuator drive value Uv is output from the coarse actuator controller 50, and the coarse actuator 48 is driven according to the drive value Uv.

By this control, the microactuator 44 follows a target track, and the coarse actuator 48 is operated so as to maintain the displacement of the microactuator 44 always at zero. That is, an observed position y of the head is feedback controlled to coincide with a target position r. This control system is especially effective for a piezoelectric microactuator whose maximum displacement is small, and unless the servo band of a microactuator control system is made sufficiently smaller than the servo band of a coarse actuator control system, a phase margin cannot be ensured.

The open-loop characteristics (open-loop transfer function) of the control system shown in FIG. 2 are expressed as follows:

$$CmPm(1+CvPv)$$

In this expression, 1+CvPv has characteristics such that a gain in a low band is the same as the characteristics of CvPv and a gain in a high band is 0 dB. That is, 1+CvPv is a proportional integral regulator (PI regulator), which acts to boost only the low-band gain. The characteristics of 1+CvPv become the characteristics of $PI^2$ or $PI^3$.

On the other hand, CmPm represents the open-loop characteristics of the microactuator control system. In the case that the microactuator is a piezoelectric actuator, Pm may be regarded as a substantially constant gain, and Cm may be configured by a simple integrator or a double integrator× phase compensator. This configuration has already been published. In the case that the microactuator is an electromagnetic microactuator, a method of using a lead-lag filter has already been published in the field of an optical disk drive.

In a compensator having the characteristics of $PI^2$ or $PI^3$, phase lag occurs in a low band. That is, the higher the servo band of the coarse actuator control system CvPv is set, the more the phase margin is reduced. Accordingly, in this control system, the servo band of the microactuator control system CmPm and the servo band of the coarse actuator control system CvPv must be separated from each other.

Another conventional two-stage actuator control system will now be described with reference to FIG. 3. In this control system, the displacement of the microactuator 44 is estimated in the microactuator model 52, and the sum of this estimated displacement and the position error between the target position r and the observed position y is input into the coarse actuator controller 50. According to this control system, the coarse actuator follows the sum of the position error and the displacement of the microactuator. While the servo band of a control system whose sensitivity function is the product of the sensitivity function of the microactuator control system and the sensitivity function of the coarse actuator control system must be separated from the servo band of the coarse actuator control system, which of the two servo bands is higher is arbitrary.

The open-loop characteristics of this control system are expressed as follows:

$$(1+CmPm)(1+CvPv)-1=CmPm+CvPv+CmPmCvPv$$

This expression is identical with the expression obtained by adding CvPv to the expression of the control system shown in FIG. 2. Accordingly, the sensitivity function can be expressed as follows:

$$1/\{(1+CmPm)(1+CvPv)\}$$

That is, the open-loop characteristics of this control system can be expressed as the product of the sensitivity function of the control system for operating the microactuator only and the sensitivity function of the control system for operating the coarse actuator only.

The open-loop characteristics substantially become CmPmCvPv in a low band and become CmPm+CvPv in a high band. Since the expression has a symmetrical form, which of the servo band of the microactuator and the servo band of the coarse actuator is higher is arbitrary. However, in the case of using a piezoelectric actuator as the microactuator, close attention must be paid to distribution of the servo bands because the maximum displacement of the piezoelectric actuator is small.

The case of using an electromagnetic actuator as the microactuator will now be considered. It is assumed that phase compensation for CmPm and CvPv is performed by a lead-lag filter. It is further assumed that the servo band of the microactuator control system and the servo band of the coarse actuator control system are equal to each other. In this case, CmPm and CvPv become asymptotic with respect to a curve of −20 dB/dec near each servo band. Accordingly, CmPmCvPv becomes asymptotic with respect to a curve of −40 dB/dec. As a result, a phase margin is reduced by the addition of CmPmCvPv. Therefore, in this control system, the servo band of the coarse actuator must be separated from the servo band of the microactuator, so as to ensure a phase margin.

In this control system, the displacement of the microactuator is estimated as similarly to the control system shown in FIG. 2. The difference between these two control systems is an input to the coarse actuator controller. That is, in the control system shown in FIG. 3, the sum of the displacement of the microactuator and the difference between the observed position and the target position of the magnetic head is input into the coarse actuator controller 50. By applying such an input to the coarse actuator controller, the control of the coarse actuator is carried out.

The control system shown in FIG. 3 has the following defects. If the servo bands (zero crossing frequency) of the coarse actuator controller and the microactuator controller approach each other, a stable control system cannot be designed. Further, the higher the gain of the coarse actuator control system is set to suppress disturbance by the coarse actuator, the less easily the phase margin of the two-stage actuator control system is ensured.

In the control system shown in FIG. 2, the servo band of the microactuator control system cannot be set lower than the servo band of the coarse actuator control system. The reason why the microactuator is intended to be used is that it is difficult for the conventional actuator using a VCM as driving means to follow variations of the target position. However, the variations of the target position have not only high frequencies such as several kHz, but also low frequencies.

For examples, in the case that the disk rotating speed is 7200 rpm, there is a large effect of disturbance having a low-frequency component including 120 Hz that is a rotational frequency and an integral multiple thereof. Even though the control is performed, it is impossible to perfectly remove such a low-frequency disturbance. Further, the displaceable distance traveled by the microactuator is limited, so that the microactuator cannot move across thousands of tracks unlike the coarse actuator using the VCM.

Accordingly, if the servo band of the coarse actuator controller is set low, the microactuator must solely follow large eccentricity. However, in some cases, this becomes difficult because of the limitation on the displaceable distance of the microactuator. It is therefore necessary to change the ratio in servo band between the microactuator controller and the coarse actuator controller according to the characteristics of the microactuator and the magnitude and frequency of the disturbance, in order to remove the disturbance more effectively.

Further, while the displacement of the microactuator is estimated from the drive value by the microactuator model in the above conventional control systems, the control is a complete open-loop control, and an actual error is not fed back. Accordingly, there is a possibility that a large difference may be produced between a position estimated by the microactuator model and an actual position of the microactuator because of errors in mechanical characteristics between the microactuator model and the actual microactuator and initial conditions at starting the control.

SUMMARY OF THE INVENTION

It is therefore an object of the present invention to provide a control system for a two-stage actuator which can freely set the ratio in servo band between microactuator control means and coarse actuator control means, and can realize high-precision stable head positioning control.

In accordance with an aspect of the present invention, there is provided a control system for a two-stage actuator for a disk drive having a base, comprising a coarse actuator having a voice coil motor as driving means mounted on said base; a microactuator mounted on said coarse actuator and carrying a head at a front end portion; first control means for controlling driving of said coarse actuator; second control means for controlling driving of said microactuator; and feedback means for calculating a position error between a target position and an observed position of said head, and inputting said position error into said first and second control means; wherein displacement of said microactuator relative to said coarse actuator is not input into said first control means.

Preferably, the DC gain of the microactuator control means is set to a finite value. Further, the servo band of a coarse actuator control system is ⅓ or more of the servo band of the two-stage actuator control system. According to the present invention, estimated displacement of the microactuator is not fed back to an input of the coarse actuator control means, so that the ratio in servo band between the microactuator control means and the coarse actuator control means can be freely set.

In accordance with another aspect of the present invention, there is provided a designing method for a two-stage actuator control system including a coarse actuator having a voice coil motor as driving means mounted on a base of a disk drive, a microactuator mounted on said coarse actuator and carrying a head at a front end portion, first control means for controlling driving of said coarse actuator, second control means for controlling driving of said microactuator, and feedback means for calculating a position error between a target position and an observed position of said head, and inputting said position error into said first and second control means, wherein displacement of said microactuator relative to said coarse actuator is not input into said first control means; said designing method comprising the steps of designing a first control system for simultaneously controlling both said coarse actuator and said microactuator; designing a second control system for controlling said coarse actuator only; and obtaining a difference between said first control system and said second control system, and dividing said difference by mechanical characteristics of said microactuator to obtain characteristics of said second control means.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 11 is a developed plan view of a cross-shaped leaf spring;

DETAILED DESCRIPTION OF THE PREFERRED EMBODIMENTS

Figure 4:
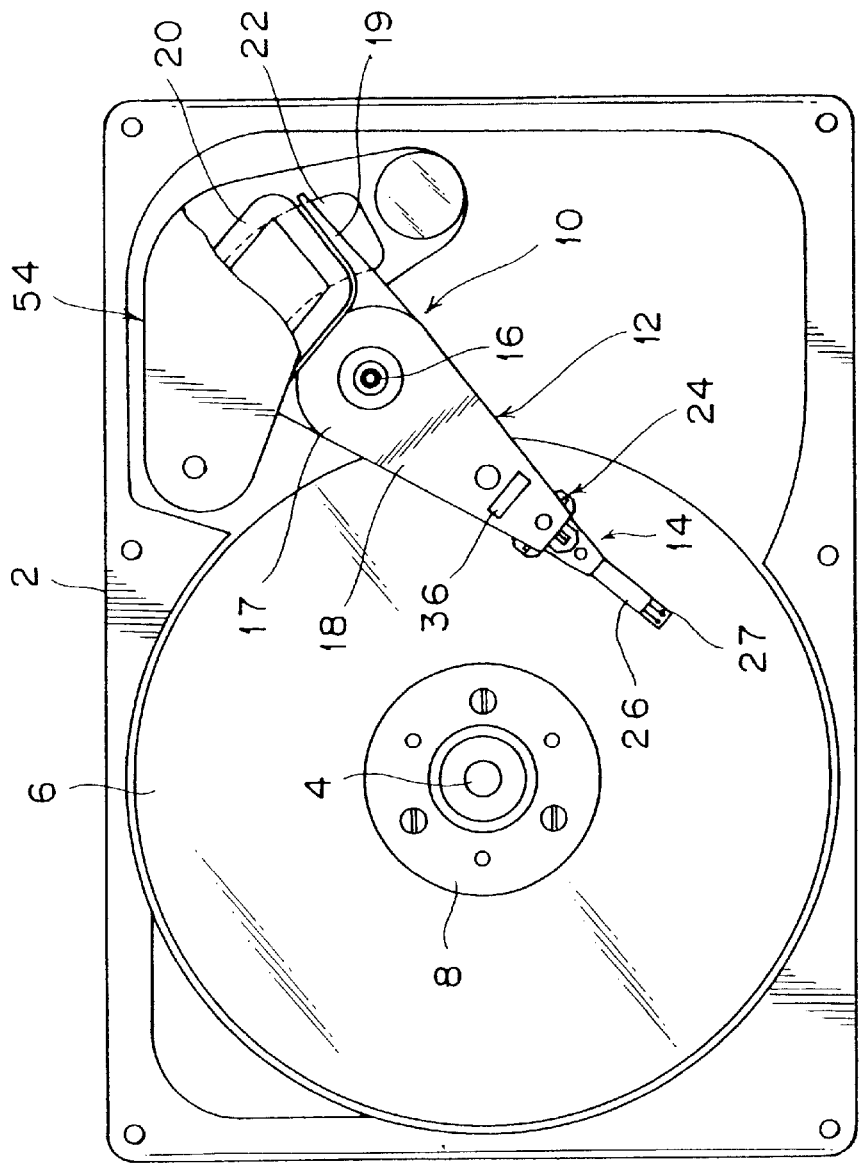
FIG. 4 is a plan view of a magnetic disk drive.

A magnetic disk drive to which a control system for a two-stage actuator according to the present invention is applicable will now be described with reference to FIG. 4. A shaft 4 is fixed to a base 2 of the magnetic disk drive, and a spindle hub (not shown) to be rotated by an inner hub motor is provided on the shaft 4. A plurality of magnetic disks 6 and spacers (not shown) are mounted on the spindle hub in such a manner as to be alternately stacked. That is, the plural magnetic disks 6 are fixedly mounted on the spindle hub by securing a disk clamp 8 to the spindle hub by screws, and are equally spaced a given distance by the spacers.

Reference numeral 10 denotes a rotary two-stage actuator consisting of a coarse actuator 12 and a microactuator 14 mounted on the coarse actuator 12. The coarse actuator 12 includes an actuator block 17 rotatably mounted through bearings on a shaft 16 fixed to the base 2. A plurality of actuator arms 18 are formed integrally with the actuator block 17. A coil supporting member 19 is formed integrally with the actuator block 17 so as to extend in a direction opposite to the direction of extension of the actuator arms 18 with respect to the shaft 16 as the center of rotation of the actuator block 17.

Figure 6:
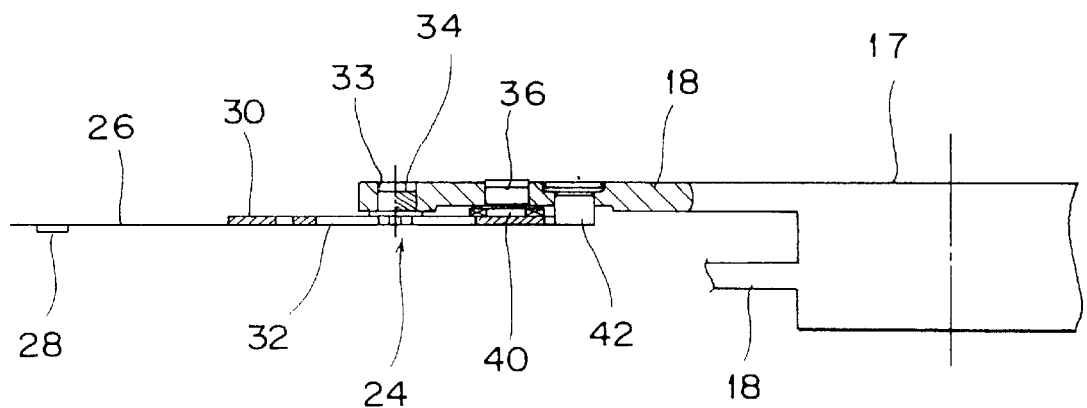
FIG. 6 is a side view of the two-stage actuator.

A flat coil 20 is supported by the coil supporting member 19. A magnetic circuit 22 is mounted on the base 2. The flat coil 20 and the magnetic circuit 22 constitute a voice coil motor (VCM) 54. The microactuator 14 is mounted on each actuator arm 18 at a front end portion thereof. More specifically, the microactuator 14 includes a load beam (suspension) 26, and a base end portion of the load beam 26 is elastically connected to the front end portion of each actuator arm 18 by elastic connecting means 24. A flexure (gimbal) 27 is formed at a front end portion of the load beam 26. As shown in FIG. 6, a slider 28 carrying a magnetic head is mounted on the flexure 27.

Figure 5:
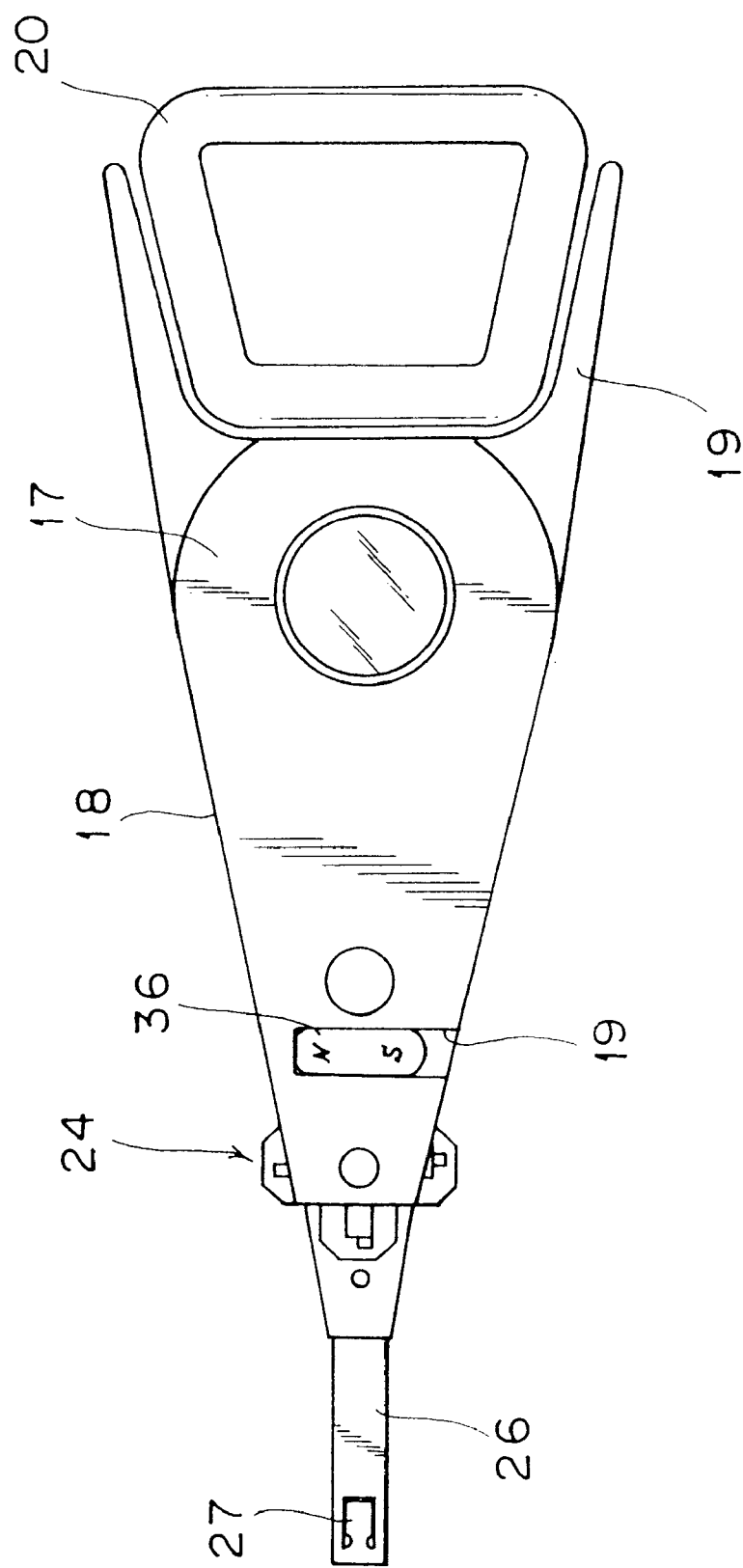
FIG. 5 is a plan view of a two-stage actuator.
Figure 7:
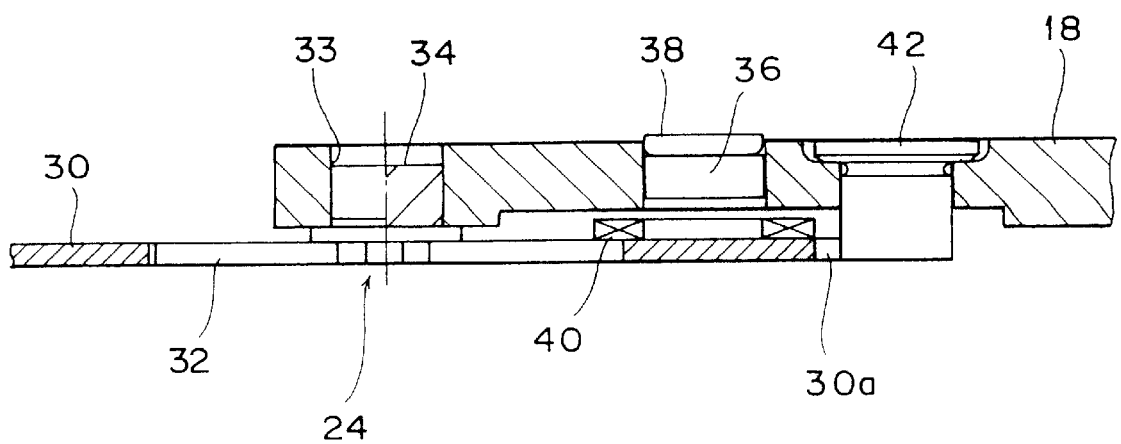
FIG. 7 is an enlarged sectional view of an essential part of the two-stage actuator shown in FIG. 6.
Figure 9A:
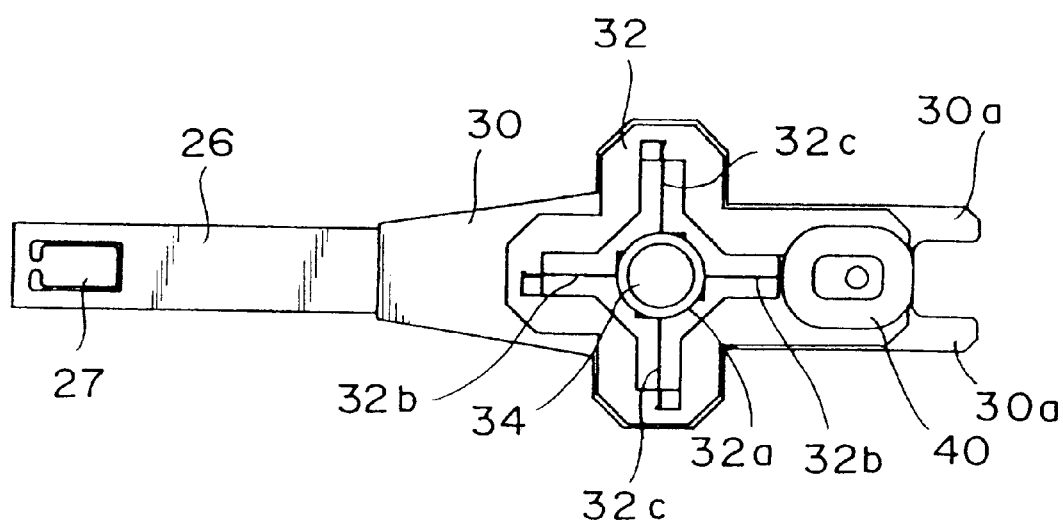
FIG. 9A is a plan view of a microactuator.
Figure 9B:
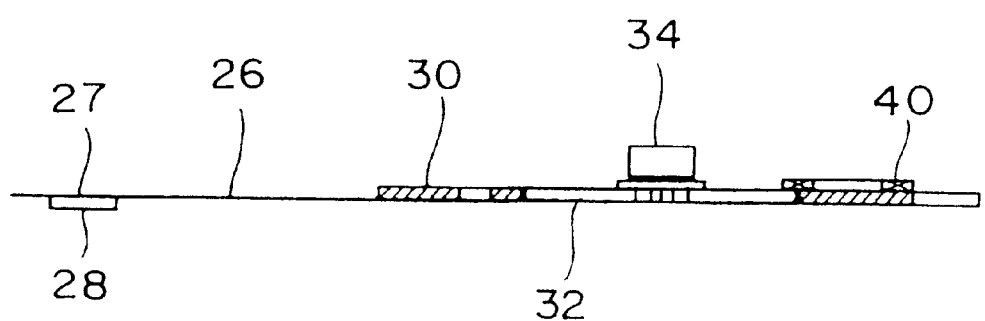
FIG. 9B is a side view of the microactuator.

Referring to FIGS. 5 to 7, the elastic connecting means 24 includes a spacer 30 fixed to the base end portion of the load beam 26 and a cross-shaped leaf spring 32 spot-welded to the spacer 30. As best shown in FIG. 9A, the cross-shaped leaf spring 32 includes a central fixed portion 32a, a pair of arms 32b extending oppositely from the central fixed portion 32a in a longitudinal direction of the load beam 26, and a pair of arms 32c extending oppositely from the central fixed portion 32a in a direction perpendicular to the direction of extension of the arms 32b.

Figure 10:
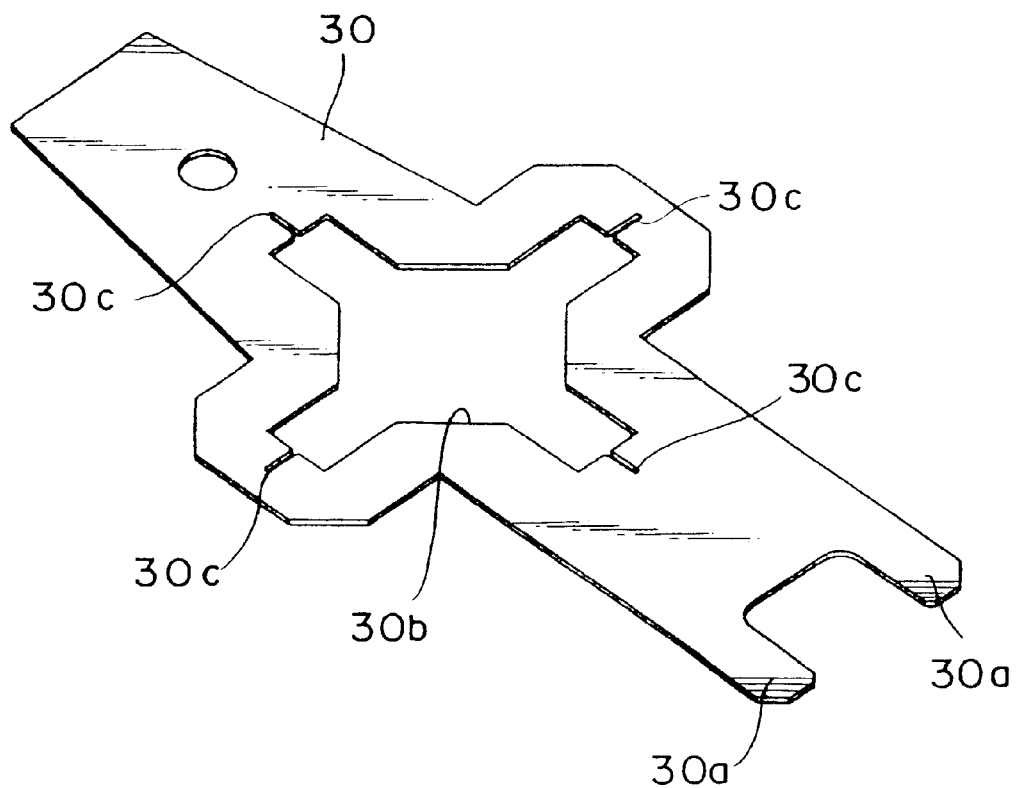
FIG. 10 is a perspective view of a spacer.

The central fixed portion 32a of the leaf spring 32 is spot-welded to a shaft 34. The shaft 34 is inserted and bonded in a hole 33 formed at the front end portion of each actuator arm 18. Thus, the load beam 26 is elastically mounted through the leaf spring 32 and the spacer 30 to each actuator arm 18. As shown in FIG. 10, the spacer 30 has one end portion formed with a pair of projections 30a serving as a stopper, and has a central portion formed with a substantially cross-shaped cutout 30b. The cutout 30b has four ends each formed with a slit 30c continuous to the cutout 30b.

Referring to FIG. 11, there is shown a developed plan view of the leaf spring 32. The leaf spring 32 has a cutout 32A having a shape substantially corresponding to the shape of the cutout 30b of the spacer 30. The leaf spring 32 is formed by bending the arms 32b and 32c along broken lines 35 and 37, respectively, in a direction perpendicular to the sheet plane of FIG. 11. More specifically, the leaf spring 32 is formed by etching a stainless steel plate having a thickness of 25 μm into a given shape with the width of each of the arms 32b and 32c set to about 0.27 mm. By this setting, the spring constant of the leaf spring 32 about the axis of the shaft 34 is designed to about $1 \times 10^{-2}$ Nm/rad. Since the arms 32b and 32c of the leaf spring 32 extend in a seek direction and a direction perpendicular thereto, resonance frequencies in a translational mode both in the seek direction and in the direction perpendicular thereto become high. The rotational rigidity of the leaf spring 32 about the axis of the shaft 34 is designed to become low.

As best shown in FIG. 9A, a coil 40 is fixed on the leaf spring 32 by adhesion or the like. A permanent magnet 36 is mounted in each actuator arm 18 so as to be opposed to the coil 40. The permanent magnet 36 has a thickness of about 0.6 mm, and it is magnetized in a thickness direction of the actuator arm 18. Preferably, the permanent magnet 36 is magnetized to have two poles. A yoke 38 is bonded on the permanent magnet 36.

Figure 12:
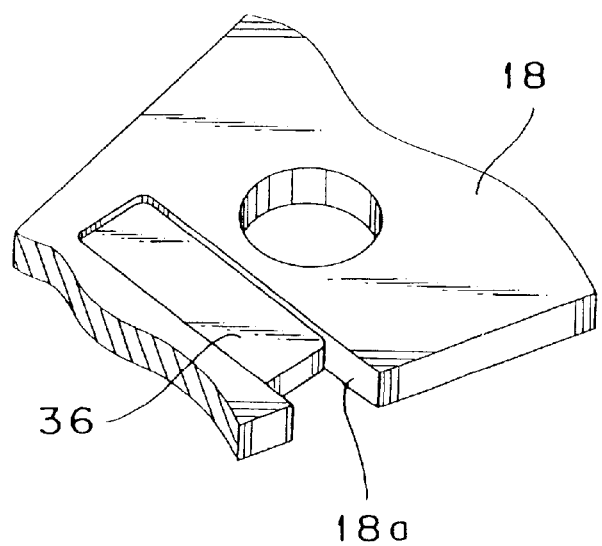
FIG. 12 is an enlarged perspective view of a magnet mounting portion.

As shown in FIG. 12, the permanent magnet 36 is inserted and bonded in a notch 18a formed in each actuator arm 18. Even in the case of a head actuator having three or more actuator arms, each permanent magnet can be easily fixed to the head actuator by this fixing method. The energy product of this permanent magnet is 3 MGOe.

As mentioned above, the pair of projections 30a are formed at one end of the spacer 30. A pin 42 is protrusively provided in each actuator arm 18 so as to be located between these projections 30a with a slight gap defined between the pin 42 and each projection 30a. That is, each projection 30a is adapted to collide with the pin 42, thereby functioning as a stopper. Accordingly, it is possible to prevent the slider from colliding with either the disk or the spindle hub.

The center of swing of the microactuator 14 composed of the load beam 26, the spacer 30, and the leaf spring 32 is so designed as to substantially coincide with the center of gravity of the microactuator 14. Accordingly, it is possible to eliminate the torque of the microactuator 14 due to a seeking acceleration or a stopper colliding acceleration of each actuator arm 18 driven by the voice coil motor 54.

Figure 8:
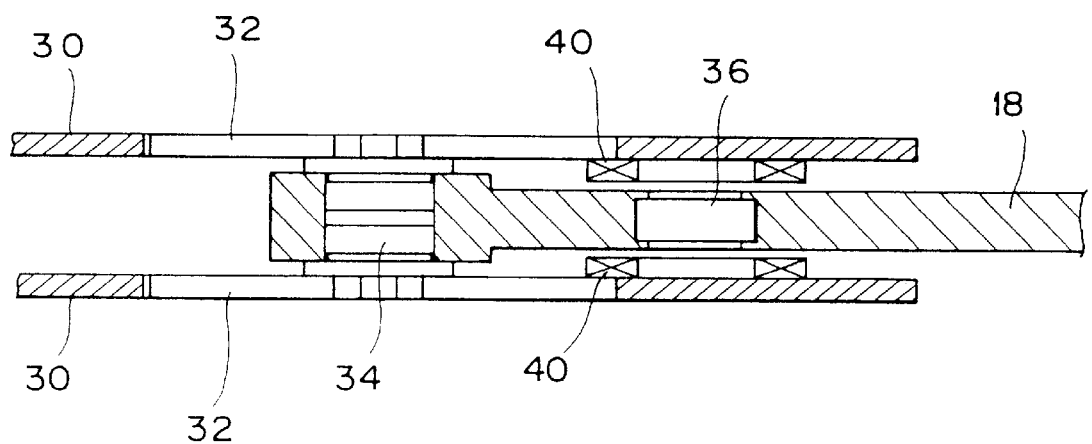
FIG. 8 is an enlarged sectional view similar to FIG. 7, showing the case where two spacers are mounted.
Figure 13:
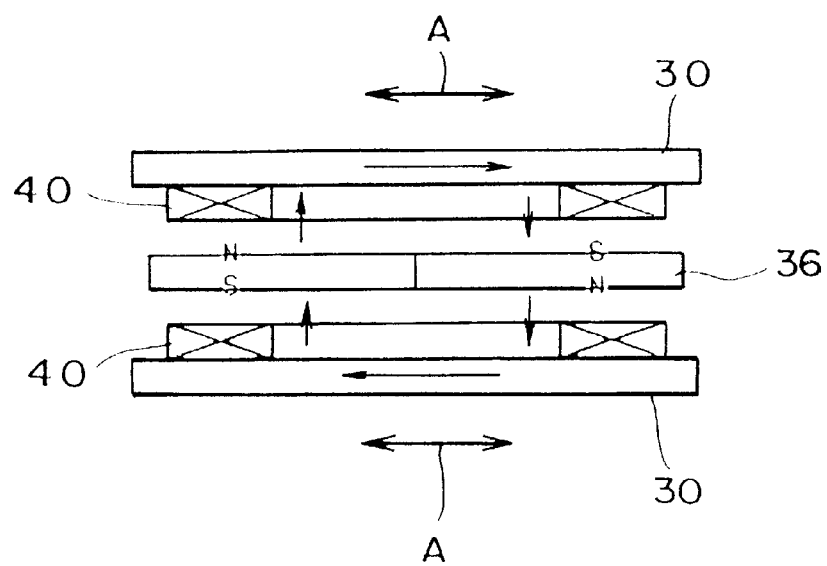
FIG. 13 is a view showing the principle of a movable coil type microactuator.

Referring to FIG. 8, there is shown a sectional view of an embodiment employing two spacers 30 and two cross-shaped leaf springs 32 mounted on the front end portion of each actuator arm 18. The two cross-shaped leaf springs 32 are fixed to the upper and lower ends of a shaft 34, and bonded to the corresponding spacers 30 in such a manner that upper and lower coils 40 respectively fixed to the upper and lower leaf springs 32 are opposed to a permanent magnet 36. According to the embodiment shown in FIG. 8, a magnetic circuit as shown in FIG. 13 is configured. By supplying a current to each coil 40, each spacer 30 is swung in the direction shown by an arrow A, and each load beam 26 is also swung in the same direction.

Figure 14:
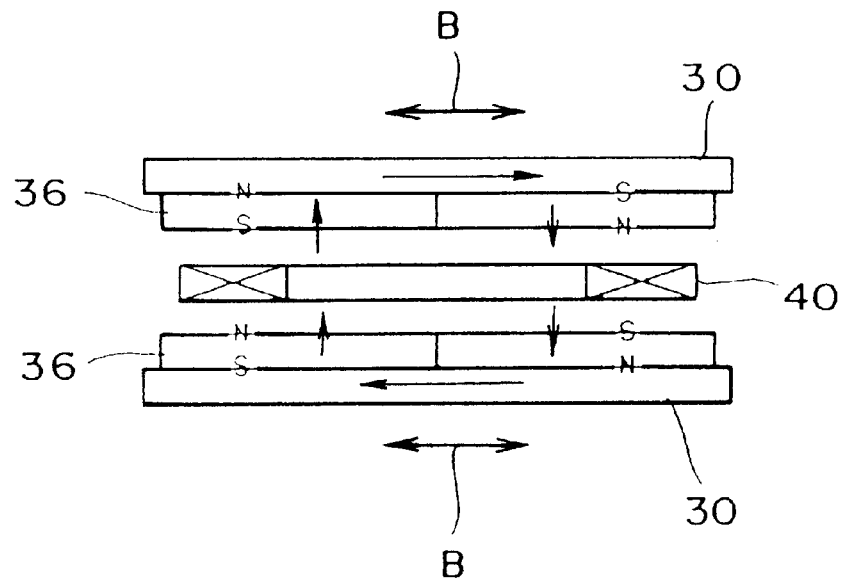
FIG. 14 is a view showing the principle of a movable magnet type microactuator.

While the microactuator 14 mentioned above is of a movable coil type such that the magnet 36 is fixed and each coil 40 is moved, the microactuator 14 may be of a movable magnet type such that a coil is mounted on the actuator arm 18 and a magnet is mounted on each spacer 30. According to this modification, a magnetic circuit as shown in FIG. 14 is configured. By supplying a current to the coil 40, each spacer 30 is swung in the direction of an arrow B. In this modification, the coil 40 serves as a stator, so that wiring connected to the coil 40 can be easily routed.

Figure 15:
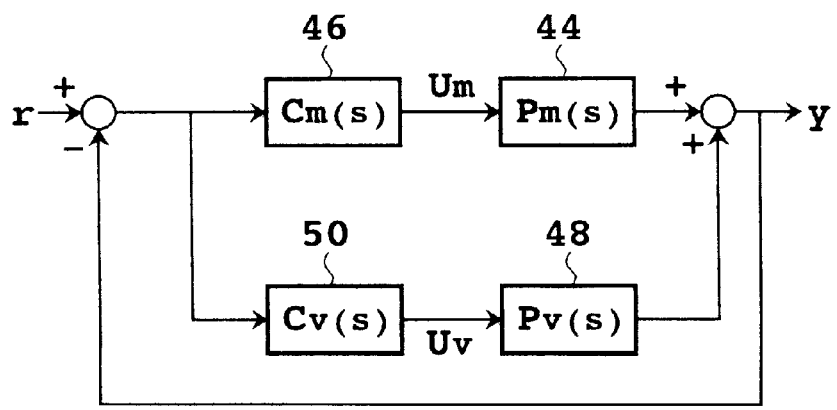
FIG. 15 is a block diagram showing the principle of a control system according to the present invention.

There will now be described a control system according to the present invention for controlling the two-stage actuator mentioned above. Referring to FIG. 15, there is shown a block diagram illustrating the principle of the control system according to the present invention. Block 44 represents a microactuator, and block 48 represents a coarse actuator. A drive value Um is output from a microactuator controller 46, and the microactuator 44 is driven according to the drive value Um. On the other hand, a drive value Uv is output from a coarse actuator controller 50, and the coarse actuator 48 is driven according to the drive value Uv.

In FIG. 15, r denotes a target position, y an observed position of the magnetic head, Pm a transfer function of the microactuator, Pv a transfer function of the coarse actuator, Cm a transfer function of a compensator for control of the microactuator, and Cv a transfer function of a compensator for control of the coarse actuator.

The control system according to the present invention is characterized in that the microactuator controller 46 and the coarse actuator controller 50 are arranged completely in parallel. That is, this control system differs from the conventional control systems shown in FIGS. 2 and 3 in the point that the displacement of the microactuator 44 relative to the coarse actuator 48 is not input into the coarse actuator controller 50. With this configuration, limitations in designing the control system become looser, so that the ratio between the servo band of the microactuator controller 46 and the servo band of the coarse actuator controller 50 should be able to be freely set.

It is to be noted here that the output from the coarse actuator 48 shows an absolute position, but the output from the microactuator 44 shows a relative position with respect to the coarse actuator 48. Therefore, the designs of the coarse actuator controller 50 and the microactuator controller 46 cannot be made identical. More specifically, the coarse actuator controller 50 is designed to include an integral element and have an infinite DC gain by this integral element. Owing to this infinite gain, a constant external bias force and an amplifier offset current can be corrected to allow location of the magnetic head at a target position.

The subject controllable by the microactuator controller 46 is a relative position of the microactuator 44 with respect to the coarse actuator 48. Accordingly, a constant bias force applied to the whole of the two-stage actuator cannot be canceled by the microactuator from a mechanical viewpoint. This means that the DC gain of the microactuator controller 46 must not be infinite. If the microactuator controller 46 is designed to have an integral element so that the DC gain becomes infinite, the microactuator increases its drive value so as to cancel the bias force. However, since the microactuator cannot cancel the bias force, it further increases the drive value, and finally the amount of displacement of the microactuator exceeds an allowable range.

More specifically, the microactuator comes to abutment against the stopper, or the drive voltage for the microactuator is saturated. In these circumstances, the control system for the two-stage actuator so designed as to perform a proper operation in its displaceable range cannot properly operate, so that a head position is greatly deviated from a target position, resulting in impossibility of data reading and writing. Accordingly, the DC gain (gain at 0 Hz) of the microactuator controller 46 must be a finite value rather than an infinite value. However, the DC gain of the microactuator controller 46 is not necessarily set at 0 because it is only necessary to set the DC gain of the microactuator controller 46 sufficiently smaller than the DC gain of the coarse actuator controller 50.

According to the control system of the present invention, both the coarse actuator 48 and the microactuator 44 follow the target. This is similar to the operations of the conventional control systems shown in FIGS. 2 and 3. The present invention is largely different from the prior art in the following points. Estimation of position is not carried out by moving a microactuator model under open-loop control. That is, a model whose initial conditions and gain are inaccurate is not used, so that the structure of the control system is simpler and the operation is accurate.

The open-loop characteristics of the control system of the present invention are expressed as follows:

$$CmPm+CvPv$$

The gain in a low band is lower than that in each conventional control system. On the other hand, the phase margin can be increased depending on design.

In the case that CmPm is identical with CvPv, for example, the following equation is given.

$$CmPm+CvPv=2CmPm$$

Accordingly, the microactuator control system can be designed by first designing the open-loop characteristics of the whole control system, next designing the coarse actuator control system, and finally subtracting the characteristics of the coarse actuator control system from the characteristics of the whole control system to determine the difference as the characteristics of the microactuator control system. Since the characteristics of the whole control system can be easily determined, phase characteristics as desired by a designer can be obtained.

According to the control system of the present invention, the ratio in servo band between the microactuator control system and the coarse actuator control system can be arbitrarily set. That is, the proportion of burden between the coarse actuator and the microactuator can be varied according to various conditions. The various conditions include a displaceable range of the microactuator, output range of a microactuator drive circuit, magnitudes and frequency components of position disturbance and acceleration disturbance, and characteristics of the microactuator. The conventional control systems have a limitation that the ratio in servo band between the coarse actuator control system and the microactuator control system cannot be freely set, and optimum conditions cannot therefore be selected.

Further, by configuring the control system so that a stable operation can be ensured by the coarse actuator controller 50 only, the control system used in controlling the coarse actuator 48 only can be utilized without any changes even in the case of controlling both the coarse actuator 48 and the microactuator 44. Owing to such design of the control system, the target can be stably followed by the coarse actuator 48 only in the event that the drive value for the microactuator 44 is saturated or the displacement of the microactuator 44 is saturated. Although a positioning accuracy is somewhat reduced, the head position is not largely deviated from the target position.

A designing method for the control system according to the present invention will now be described.

Basic Designing Method

First, the transfer function of the two-stage actuator control system as a whole is designed. The characteristics of the whole control system are decided by the characteristics of position disturbance and acceleration disturbance. Next, the characteristics of the coarse actuator control system are decided. That is, the transfer function of the coarse actuator control system is designed so that the two-stage actuator is stably operated only by the control of the coarse actuator without the control of the microactuator.

Finally, a difference between the transfer functions of the two control systems is calculated, and this difference is multiplied by the reverse characteristics of the microactuator to design the transfer function of the microactuator controller 46. Alternatively, the design of the microactuator control system rather than the design of the coarse actuator control system may be preceded, and the coarse actuator control system may be finally designed.

Further, the coarse actuator control system constituting the two-stage actuator control system may be designed so that the coarse actuator control system alone does not stably operate. More specifically, the microactuator control system is designed so that the gain in a high band is high, and the coarse actuator control system is designed so that the gain in a low band is high. This design is based on the knowledge that it is sufficient that the two-stage actuator control system is stable as a whole. In this case, however, attention must be paid to the fact that if the drive value for the microactuator is saturated or the displacement is saturated, the head position becomes out of control and is largely deviated from the target position.

The cases of using a piezoelectric microactuator and an electromagnetic microactuator as the microactuator will now be considered. In an electrostatic microactuator, displacement is represented as a quadratic function of drive voltage. However, the electrostatic microactuator becomes substantially the same as the piezoelectric microactuator by utilizing a section where the displacement is substantially linear. Accordingly, a control system for the electrostatic microactuator may be designed as similarly to that for the piezoelectric microactuator.

Piezoelectric Microactuator

A piezoelectric microactuator can obtain a position proportional to a drive voltage in a frequency region lower than its own resonance frequency. Further, the influence of hysteresis owned by a piezoelectric element can be reduced depending on design. That is, it can be regarded that a piezoelectric microactuator model has a constant gain in the simplest case.

In the case of taking a resonance frequency in a high band into consideration, the piezoelectric microactuator model can be expressed in the form of quadratic function. However, in designing the control system, the piezoelectric microactuator model may be regarded to have a substantially constant gain near a servo band, because the resonance frequency is sufficiently higher than the servo band. The influence of resonance is removed by using a notch filter or a low-pass filter to prevent generation of vibration or instability of control. As similar to an electromagnetic microactuator to be hereinafter described, there is a change in relative position of the piezoelectric microactuator with respect to the coarse actuator due to rotational movement of the coarse actuator. However, since the resonance frequency of the piezoelectric microactuator is originally high, the piezoelectric microactuator undergoes almost no influence due to rotational movement of the coarse actuator.

Electromagnetic Microactuator

The structure of an electromagnetic microactuator is similar to that of a voice coil motor (VCM) used in the conventional coarse actuator. Accordingly, it can be regarded that an electromagnetic microactuator model (transfer function) is also similar to a coarse actuator model. That is, the electromagnetic microactuator can obtain a position proportional to a two-stage integral of input current. It is to be noted here that the resonance frequency of the electromagnetic microactuator can be made high.

As mentioned above, the electromagnetic microactuator is fixed to the coarse actuator by the spring. Accordingly, the electromagnetic microactuator shows spring characteristics such that displacement is proportional to current in a low frequency region, so that the displacement exactly becomes a quadratic function rather than a two-stage integral. In the case of a rotary two-stage actuator, movement of the coarse actuator causes movement of the center of rotation of the electromagnetic microactuator even if the spring force is zero and the frictional force is zero, resulting in a change in relative distance (angle) between the electromagnetic microactuator and the coarse actuator.

It is therefore necessary to consider the relative positional relation between the coarse actuator and the electromagnetic microactuator. This relative positional relation is determined by the ratio between a distance from the center of rotation of the coarse actuator to the magnetic head and a distance from the center of rotation of the electromagnetic microactuator to the magnetic head.

A specific designing method for the control system will now be described.

First, a control system having a simplest configuration of PI×Lead-Lag is designed as coarse actuator control means. Next, a two-stage actuator control system suitable for a microactuator model is designed.

The design specifications are assumed as follows:
Servo band of the two-stage actuator control system: 2 kHz
Servo band of the coarse actuator control system: about 700 Hz These servo bands are merely assumed values for proving that the design can be surely realized. In actuality, these servo bands are influenced by saturation of a drive current for the microactuator, limitation of the displacement of the microactuator, and limitations of the magnitudes and frequencies of position disturbance and acceleration disturbance as mentioned above, and an optimum constant and transfer function of the control system vary according to conditions.

The models (transfer functions) are set as follows:
Coarse actuator model: $1/s^2$
Microactuator model: 1 or $1/s^2$ (s: Laplace operator)

If the models take actual values, gain can be changed by gain setting for a drive circuit. Therefore, the above-mentioned models are set as models for proving the effectiveness of design. In actual design, however, a gain fitted to a mechanical constant should be included in each model. Basically, a model considering the influence of the coarse actuator to the microactuator and the spring characteristics of the coarse actuator can be replaced by the model of $1/s^2$. In this case, however, the influence of antiresonance must be considered (compensated) as will be hereinafter described.

Figure 16A:
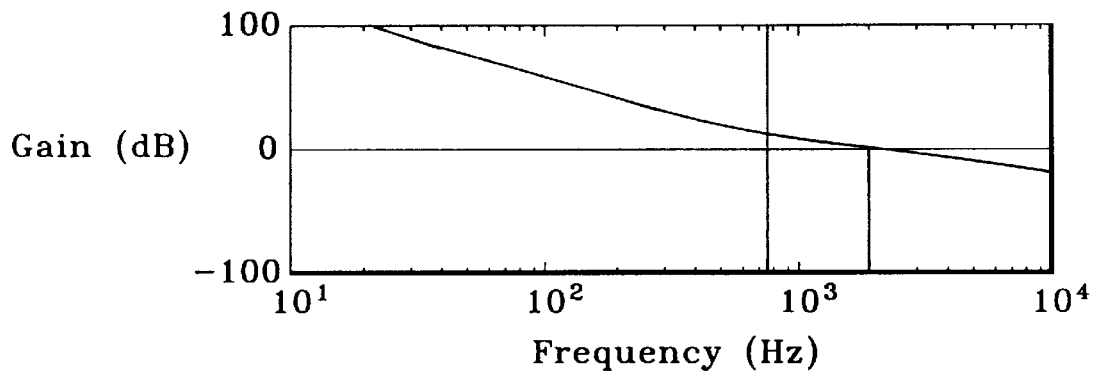
FIGS. 16A and 16B are graphs showing the open-loop characteristics of a control system for a two-stage actuator having a piezoelectric microactuator.
Figure 16B:
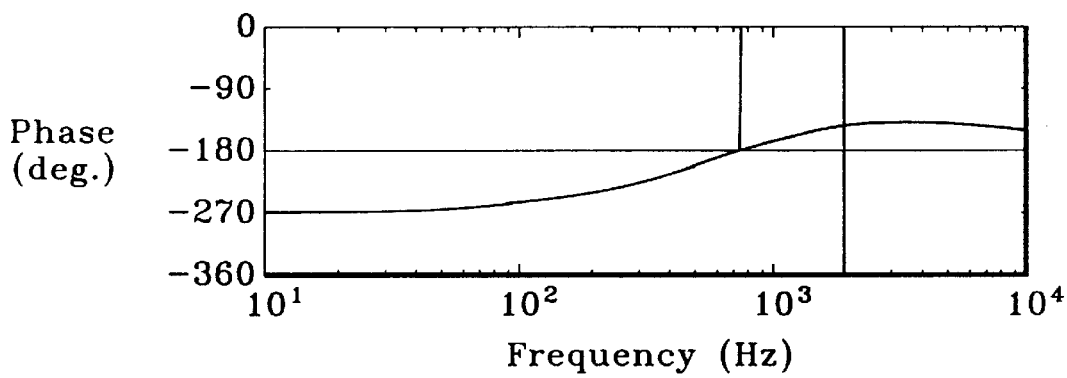
Figure 17A:
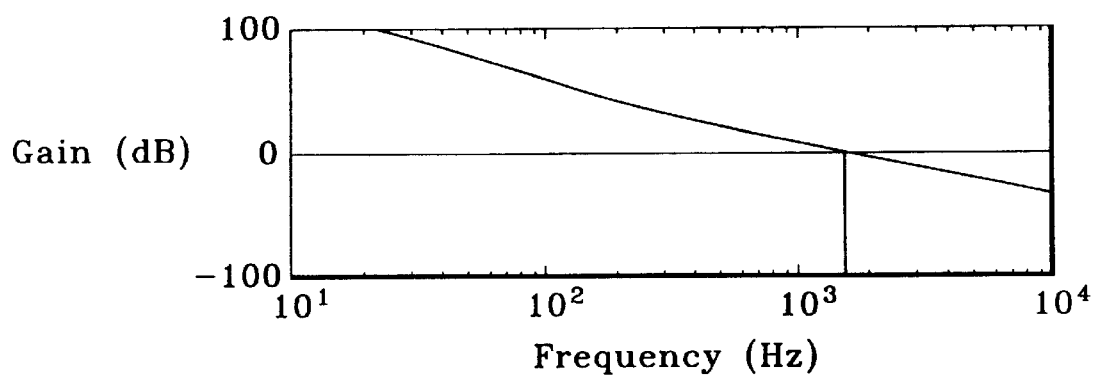
FIGS. 17A and 17B are graphs showing the frequency characteristics of a coarse actuator control system in the control system of FIGS. 16A and 16B.
Figure 17B:
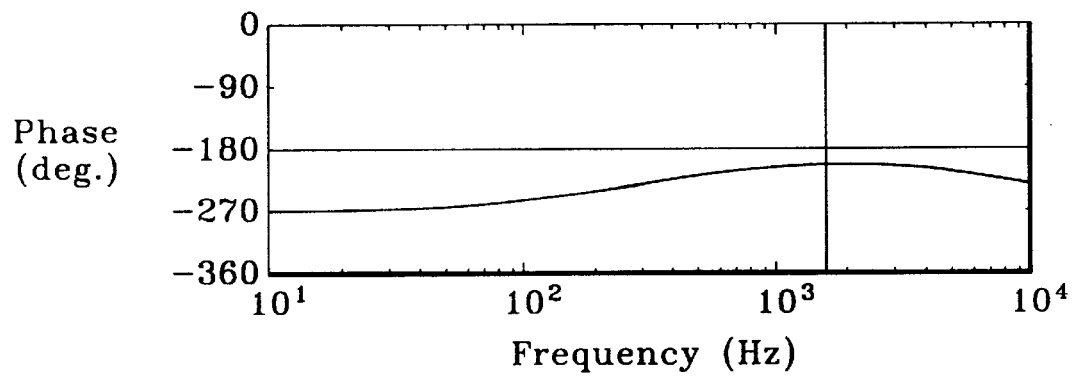
Figure 18A:
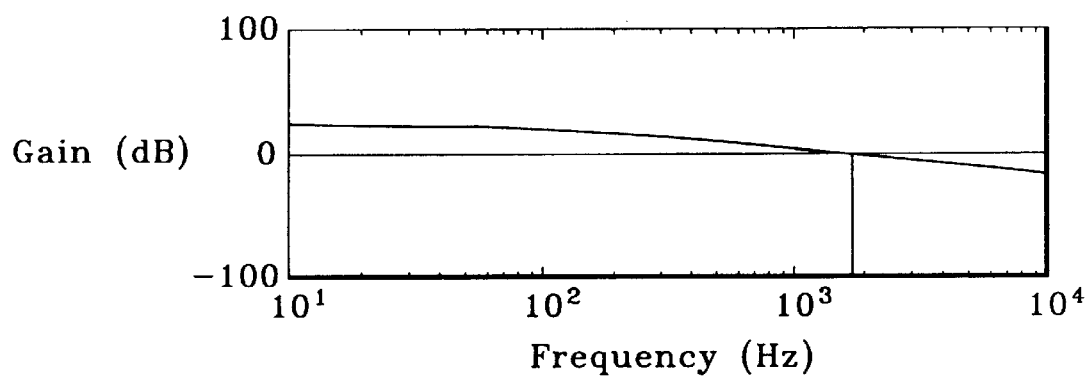
FIGS. 18A and 18B are graphs showing the frequency characteristics of a piezoelectric microactuator control system in the control system of FIGS. 16A and 16B.
Figure 18B:
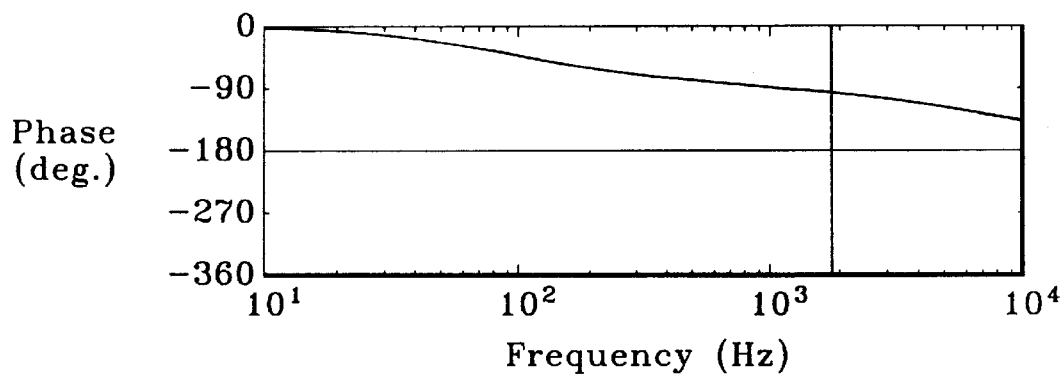

(1) The case where the microactuator model is 1 (the case where the resonance frequency is high):

FIGS. 16A to 18B show frequency characteristics in this case. More specifically, FIGS. 16A and 16B show the open-loop characteristics of a control system for a two-stage actuator having a piezoelectric microactuator; FIGS. 17A and 17B show the frequency characteristics of a coarse actuator control system in the control system of FIGS. 16A and 16B; and FIGS. 18A and 18B show the frequency characteristics of a piezoelectric microactuator control system in the control system of FIGS. 16A and 16B. In FIG. 16A, Gm denotes a gain margin, and Pm denotes a phase margin.

First, the open-loop characteristics of the two-stage actuator control system are designed as follows:

$$(s+\omega 1)^2/\{s\times(s+\omega 2)\}\times(1/s^2)=(s^2+2\times\omega 1\times s+\omega 1^2)/\{s^3\times(s+\omega 2)\}$$

where $\omega 1$ and $\omega 2$ denote angular frequencies.

Further, the coarse actuator control system is designed as follows:

$$(2\times\omega 1\times s+\omega 1^2)/\{s\times(s+\omega 2)\}\times(1/s^2)$$

This expression is identical with an expression obtained by subtracting only $s^2$ from the numerator of the above expression showing the open-loop characteristics of the two-stage actuator control system.

Next, a compensator for the piezoelectric microactuator is designed as the difference between the above two expressions to give $$1/\{s(s+\omega 2)\}$$

To prevent the DC gain of the piezoelectric microactuator control system from becoming infinite, an integrator is replaced by a low-pass filter (cutoff angular frequency: $\omega 3$) to give $$1/\{(s+\omega 3)(s+\omega 2)\}$$

Figure 19A:
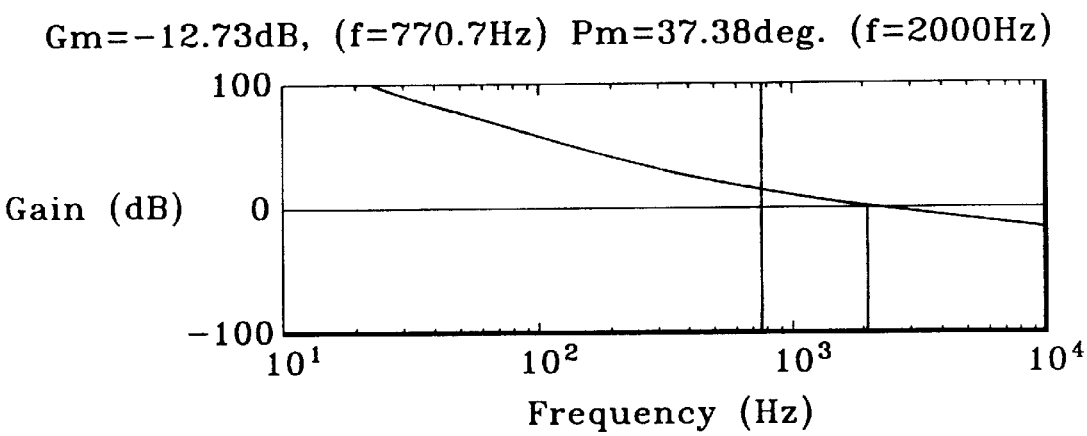
FIGS. 19A and 19B are graphs showing the open-loop characteristics of a control system for a two-stage actuator having an electromagnetic microactuator.
Figure 19B:
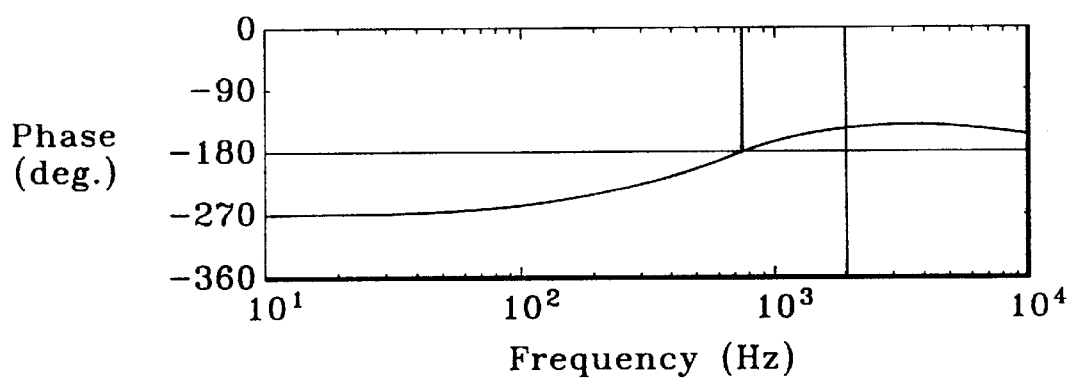
Figure 20A:
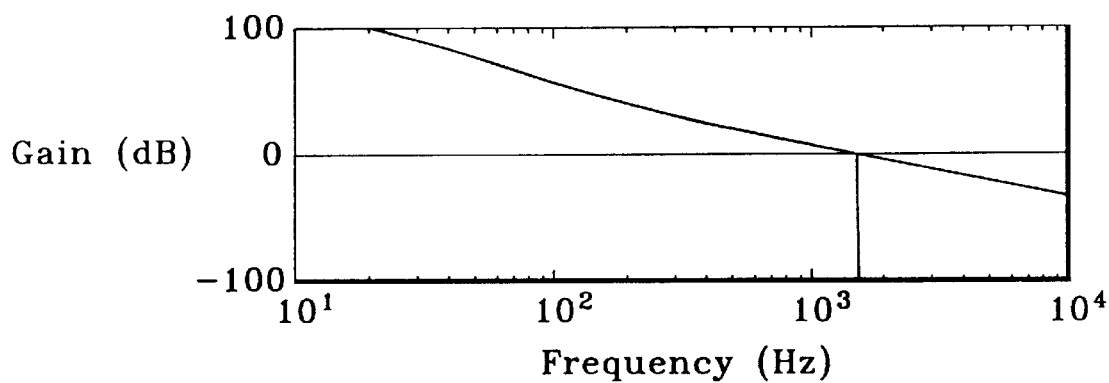
FIGS. 20A and 20B are graphs showing the frequency characteristics of a coarse actuator control system in the control system of FIGS. 19A and 19B.
Figure 20B:
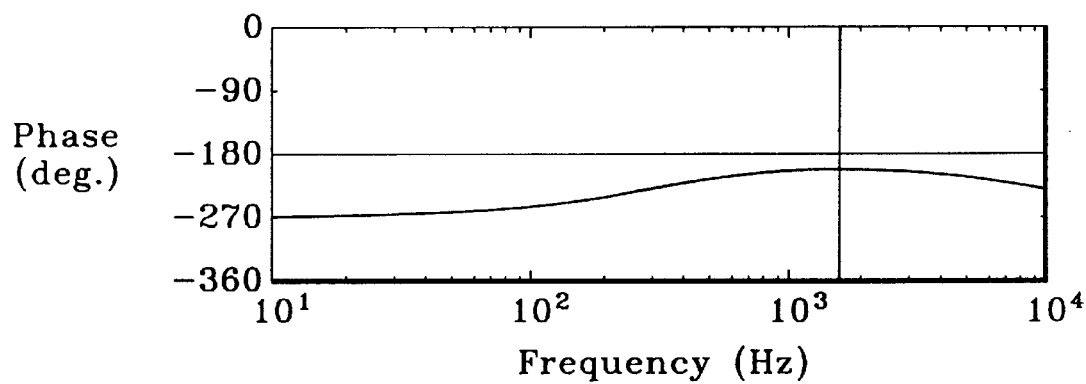
Figure 21A:
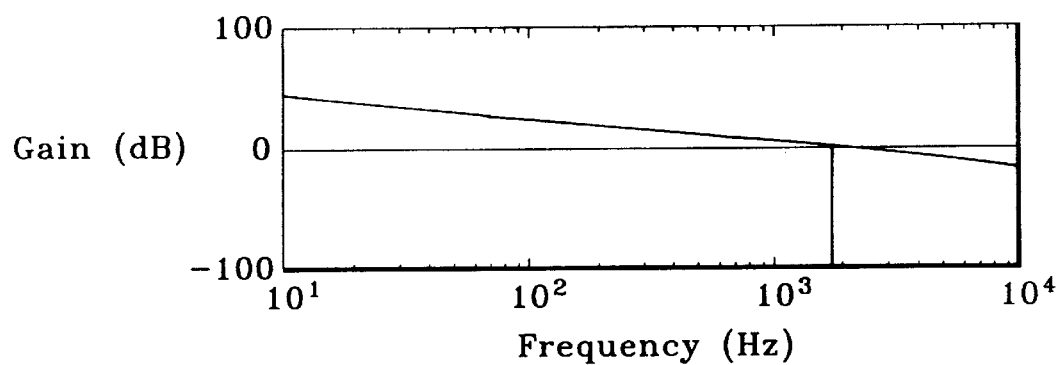
FIGS. 21A and 21B are graphs showing the frequency characteristics of an electromagnetic microactuator control system in the control system of FIGS. 19A and 19B.
Figure 21B:
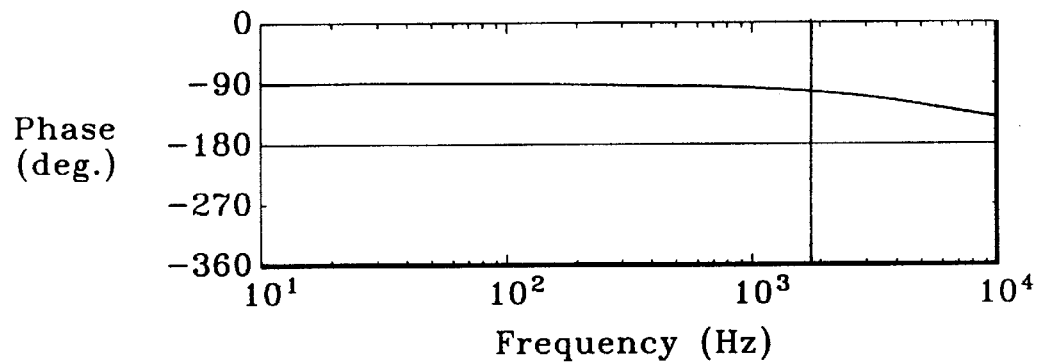

(2) The case where the microactuator model is $1/s^2$ (first case where the resonance frequency is low):

FIGS. 19A to 21B show frequency characteristics in the case where an electromagnetic microactuator is used as the microactuator. More specifically, FIGS. 19A and 19B show the open-loop characteristics of a control system for a two-stage actuator having an electromagnetic microactuator; FIGS. 20A and 20B show the frequency characteristics of a coarse actuator control system in the control system of FIGS. 19A and 19B; and FIGS. 21A and 21B show the frequency characteristics of an electromagnetic microactuator control system in the control system of FIGS. 19A and 19B.

As similar to the case (1), the open-loop characteristics of the two-stage actuator control system are first designed as follows:

$$K(s+\omega1)^2/\{sx(s+\omega2)\} \times (1/s^2) = K(s^2+2\times\omega1\times s+\omega1^2)/\{s^3 \times (s+\omega2)\}$$

Next, the coarse actuator control system is designed as follows:

$$K(2\times\omega1\times s+\omega1^2)/\{sx(s+\omega2)\} \times (1/s^2)$$

This expression is identical with an expression obtained by subtracting $s^2$ from the numerator of the above expression showing the open-loop characteristics of the two-stage actuator control system.

The microactuator control system is designed as the difference between the above two expressions to give $$Ks^2/\{s(s+\omega2)\} \times (1/s^2)$$

(3) The case where the microactuator model is $1/s^2$ (second case where the resonance frequency is low):

This case is similar to the case (2) adopting the electromagnetic microactuator as the microactuator. However, in the configuration of this control system, stable operation can be ensured only by the coarse actuator even when the driving means for the microactuator is saturated or the microactuator itself is saturated because of moving beyond its displaceable range.

Figure 22A:
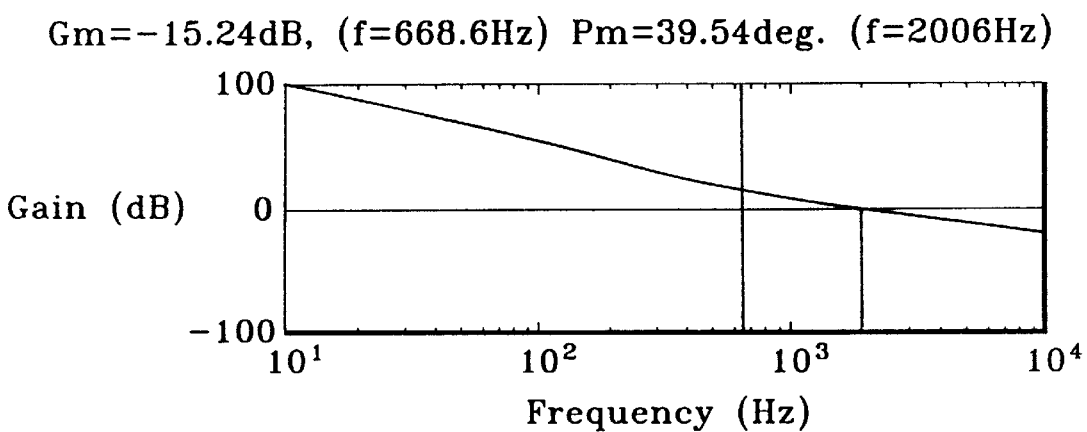
FIGS. 22A and 22B are graphs showing the open-loop characteristics of another control system for a two-stage actuator having an electromagnetic microactuator.
Figure 22B:
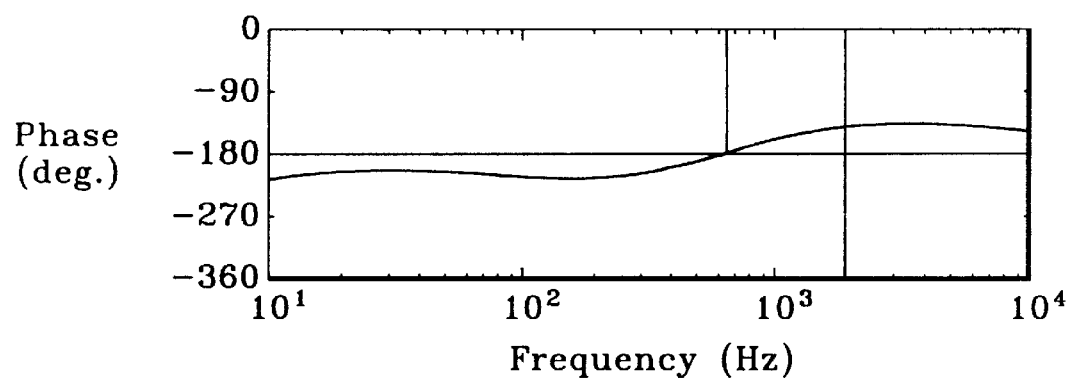
Figure 23A:
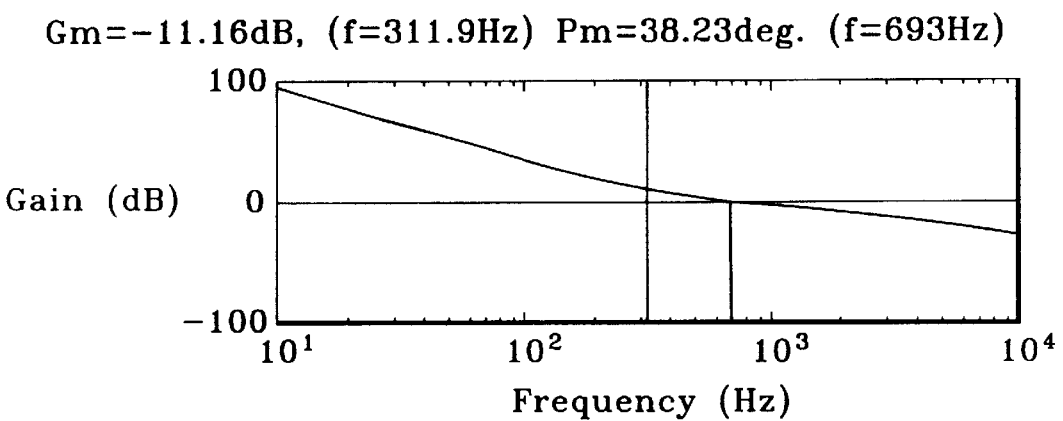
FIGS. 23A and 23B are graphs showing the frequency characteristics of a coarse actuator control system in the control system of FIGS. 22A and 22B.
Figure 23B:
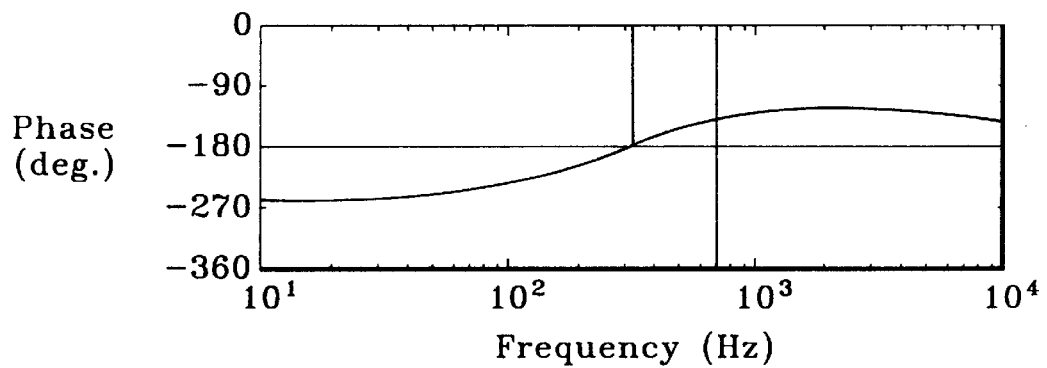
Figure 24A:
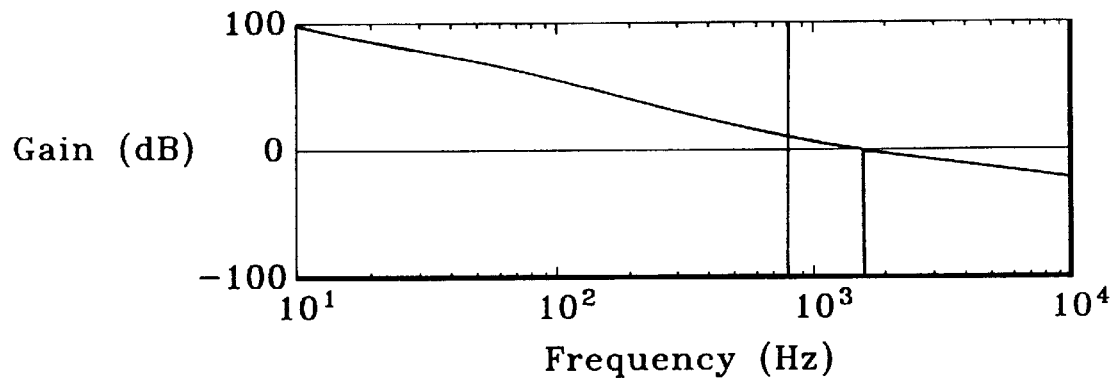
FIGS. 24A and 24B are graphs showing the frequency characteristics of an electromagnetic microactuator control system in the control system of FIGS. 22A and 22B.
Figure 24B:
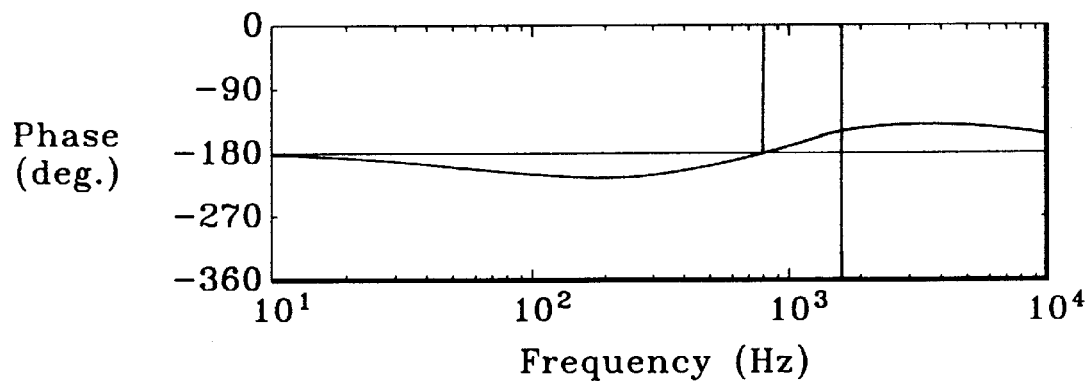

FIGS. 22A to 24B show frequency characteristics in this case. More specifically, FIGS. 22A and 22B show the open-loop characteristics of a control system for a two-stage actuator having an electromagnetic microactuator; FIGS. 23A and 23B show the frequency characteristics of a coarse actuator control system in the control system of FIGS. 22A and 22B; and FIGS. 24A and 24B show the frequency characteristics of an electromagnetic microactuator control system in the control system of FIGS. 22A and 22B.

As similar to the cases (1) and (2), the open-loop characteristics of the two-stage actuator control system are designed as follows:

$$K(s+\omega1)^2/\{sx(s+\omega2)\} \times (1/s^2) = K(s^2+2\times\omega1\times s+\omega1^2)/\{s^3 \times (s+\omega2)\}$$

To ensure stable operation only by the coarse actuator, the coarse actuator control system is so designed as to have a PI×Lead-Lag configuration to give $$K'(s+\omega4)^2/\{sx(s+\omega2)\} \times (1/s^2)$$

The microactuator control system is designed as the difference between the above two expressions to give $$K''\{2\times(\omega1-\omega4)\times s+(\omega1^2-\omega4^2)\}/\{sx(s+\omega2)\} \times (1/s^2)$$

Here, it is necessary to prevent the DC gain of the microactuator control system from becoming infinite. To this end, an integrator is replaced by a low-pass filter (cutoff frequency: $\omega3$) to give $$K''\{2\times(\omega1-\omega4)\times s+(\omega1^2-\omega4^2)\}/\{(s+\omega3)\times(s+\omega2)\} \times (1/s^2)$$

As mentioned above, stable operation is ensured only by the coarse actuator in the control system of the case (3). Naturally, the positioning accuracy itself in this case is lower than that in the case where both the coarse actuator and the microactuator are controlled. However, there is no possibility of uncontrollable operation.

Figure 1:
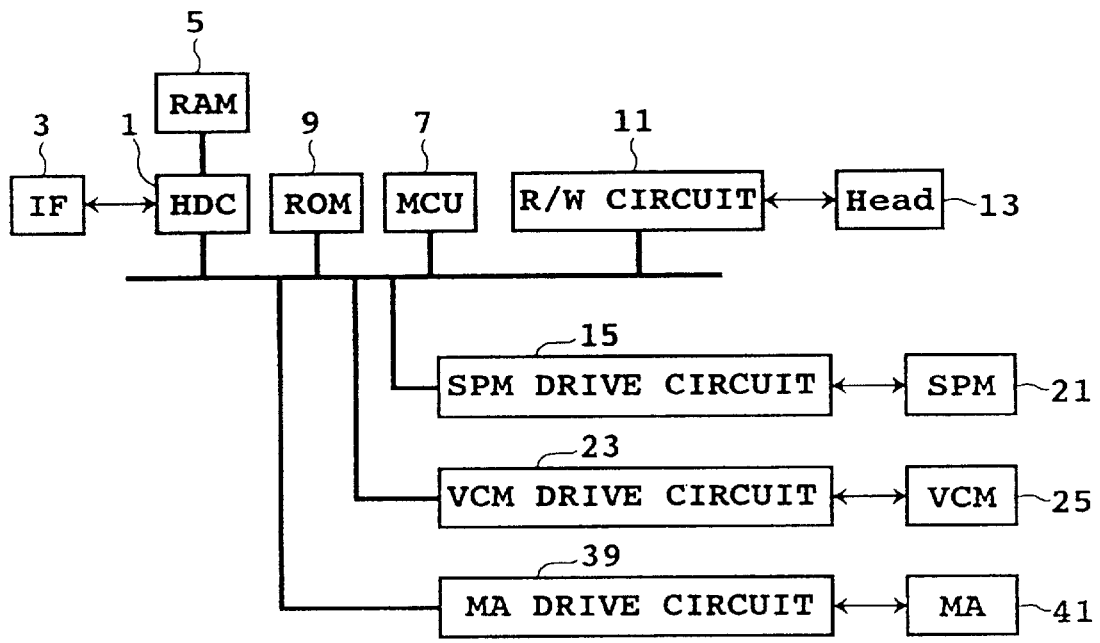
FIG. 1 is a block diagram showing a circuit configuration of a magnetic disk drive having a two-stage actuator.
Figure 2:
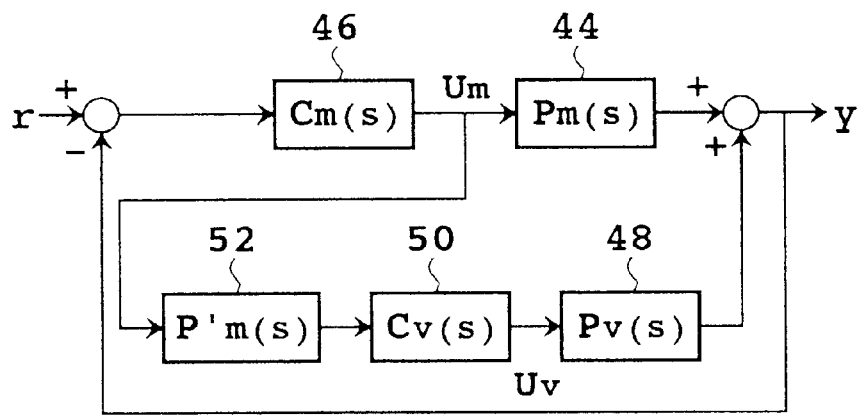
FIG. 2 is a block diagram showing a conventional control system for a two-stage actuator.
Figure 3:
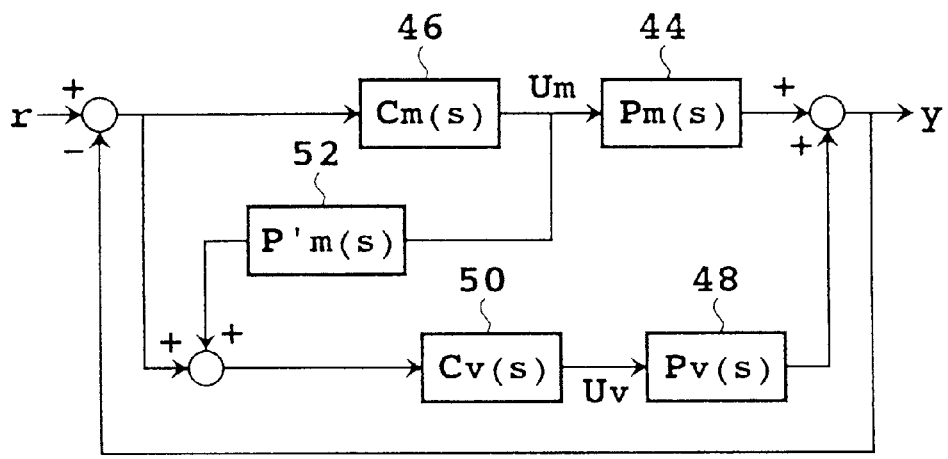
FIG. 3 is a block diagram showing another conventional control system for a two-stage actuator.

In the conventional control systems shown in FIGS. 2 and 3, the microactuator model is moved under open-loop control, and estimated displacement is inaccurate. Furthermore, the coarse actuator follows the inaccurate estimated displacement. As a result, if the microactuator is saturated, the possibility of uncontrollable operation is high.

In a conventional optical disk drive, the servo band of a coarse actuator control system is set to 100 Hz to 200 Hz, which is about 1/10 of the servo band of a two-stage actuator control system. With this setting of the servo band, the coarse actuator appears to be substantially at rest as viewed from the microactuator side. In a conventional magnetic disk drive using a piezoelectric microactuator, the servo band of a coarse actuator control system is set to less than 1/3 of the servo band of a two-stage actuator control system.

By adopting the parallel control method of the present invention, the servo band of the coarse actuator control system can be set to 1/3 or more of the servo band of the two-stage actuator control system. Specifically, a servo band of 1/2 can be realized. Such a high servo band ratio can be realized only by arranging the microactuator control system and the coarse actuator control system in parallel to allow easy designing of the whole control system.

Figure 25:
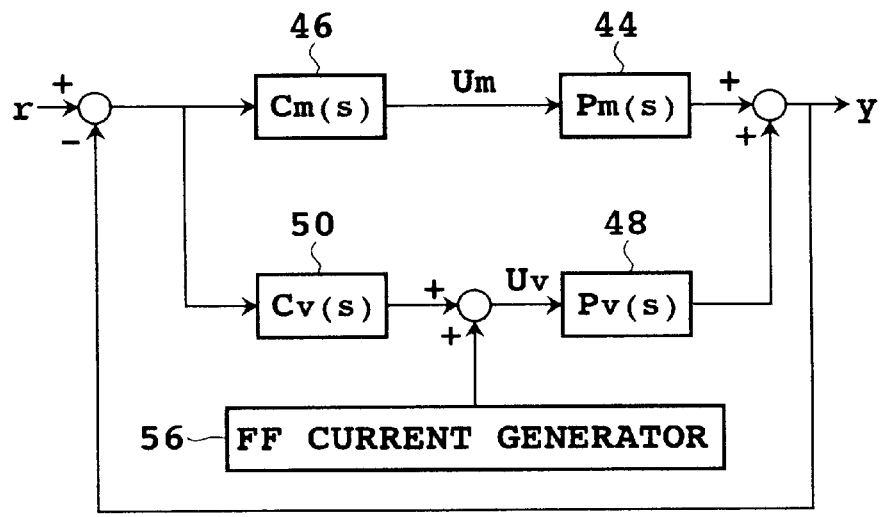
FIG. 25 is a block diagram showing a first preferred embodiment of eccentricity compensation.

Referring to FIG. 25, there is shown a block diagram of a first preferred embodiment of eccentricity compensation. Eccentricity or the like of the spindle shaft causes eccentricity of positioning information on the concentric circles recorded on the magnetic disk, so it is necessary to compensate for such eccentricity. Since the displaceable range of the microactuator is limited, it is difficult for the microactuator to follow the eccentricity. Accordingly, the eccentricity is followed by the coarse actuator. In this preferred embodiment, an eccentricity correcting current previously measured by a feed-forward current generator 56 is added to the drive value Uv output from the coarse actuator controller 50. The previously measured eccentricity correcting current is stored in a ROM so as to correspond to an address on the magnetic disk, for example.

Figure 26:
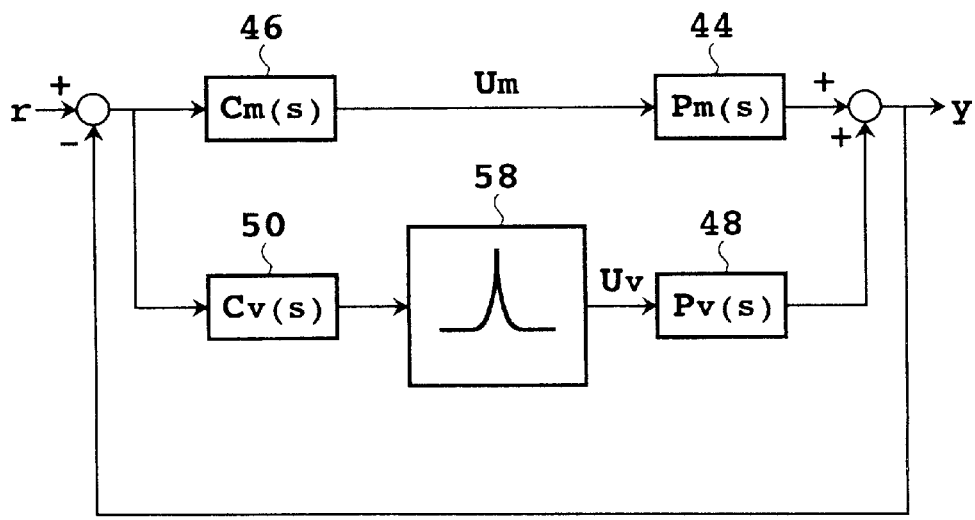
FIG. 26 is a block diagram showing a second preferred embodiment of eccentricity compensation.

Referring to FIG. 26, there is shown a block diagram of a second preferred embodiment of eccentricity compensation. In this preferred embodiment, a filter 58 having such characteristics that a gain near a frequency of oscillation of a position error signal due to eccentricity is inserted in series with the coarse actuator controller 50, thereby compensating for a large part of eccentricity on the coarse actuator 48 side. Also in the eccentricity compensation by the filter, the filter is inserted on the coarse actuator 48 side only because the microactuator 44 cannot follow large eccentricity.

Figure 27:
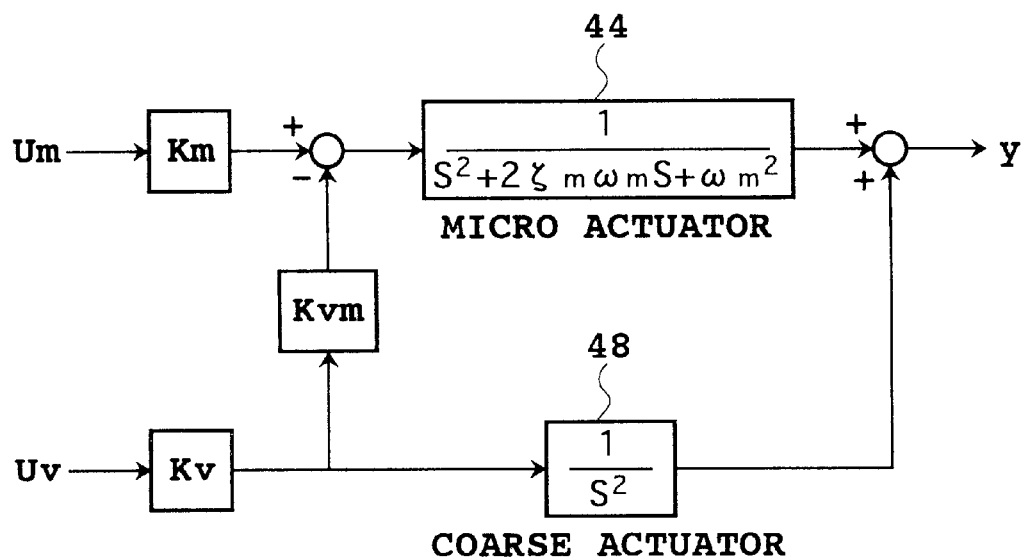
FIG. 27 is a block diagram illustrating an antiresonance compensating method.

There will now be examined a model taking a resonance frequency in a high band into consideration with reference to FIG. 27. In this case, the transfer function of the microactuator 44 can be expressed as $1/(s^2+2\zeta_m\omega_m s+\omega_m^2)$, and the transfer function of the coarse actuator 48 can be expressed as $1/s^2$. In FIG. 27, Km is the acceleration constant of the microactuator; Kv is the acceleration constant of the coarse actuator; and Kvm is the opposite-directional acceleration constant proportional to the amount of movement of the coarse actuator. Further, $\zeta_m$ is the damping constant, and $\omega_m$ is the resonance frequency.

In this model, the product of the acceleration of the coarse actuator 48 and a constant gain (−Kvm) is added to the microactuator side. While there is an effect from the microactuator side to the coarse actuator side, this effect is almost negligible. In a magnetic disk drive having a rotary actuator, the product of the acceleration of the coarse actuator and a gain of less than 1 is added as the acceleration of the microactuator. FIGS. 28A to 31B show frequency characteristics in this case. In a linear actuator, the gain to be multiplied is 1, and no antiresonance appears.

Figure 28A:
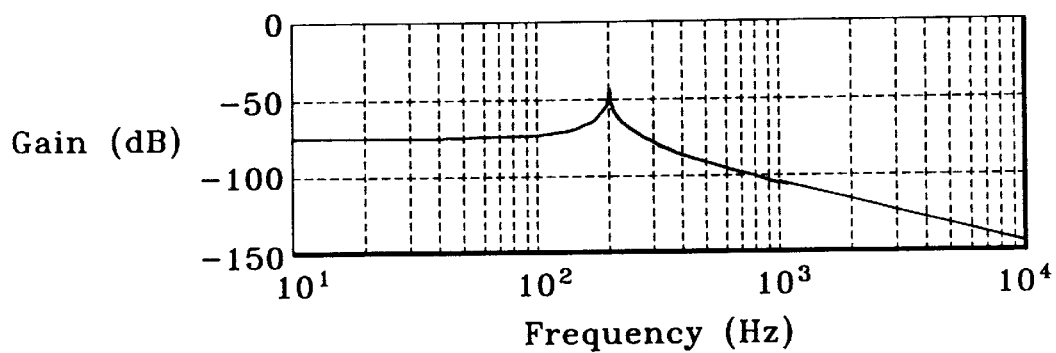
FIGS. 28A and 28B are graphs showing the frequency characteristics of y/Um.
Figure 28B:
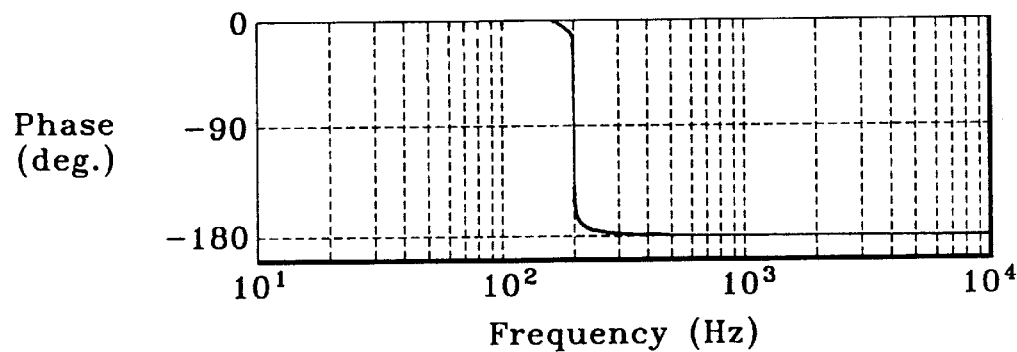
Figure 29A:
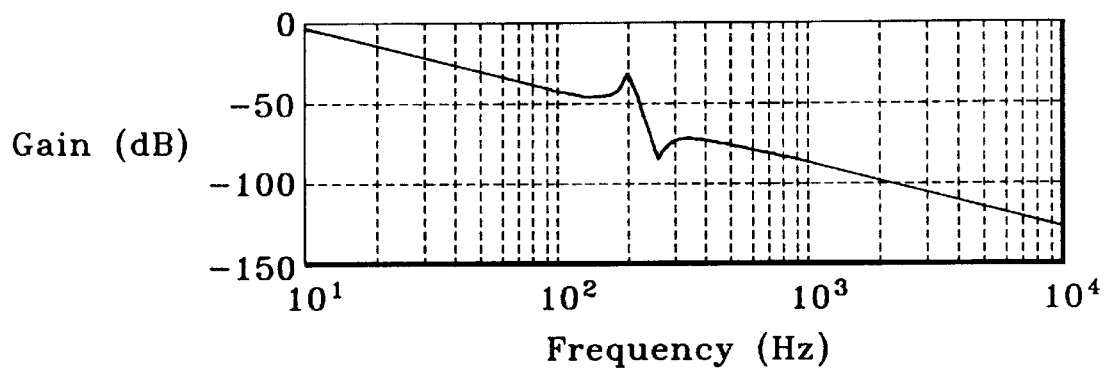
FIGS. 29A and 29B are graphs showing the frequency characteristics of y/Uv.
Figure 29B:
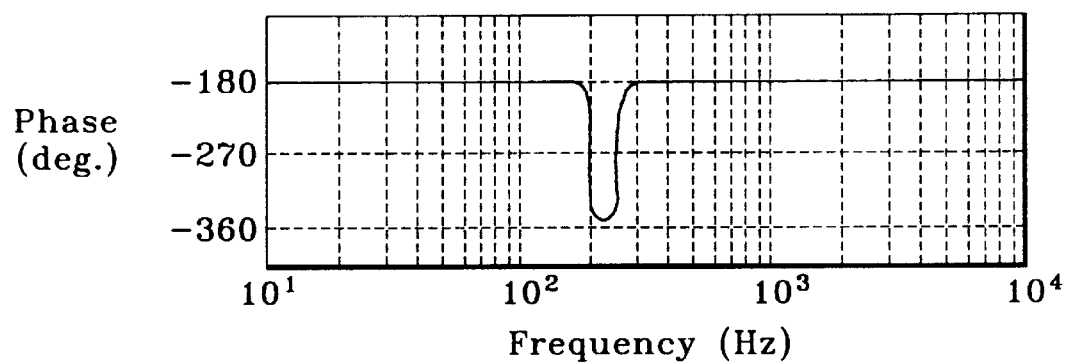

FIGS. 28A and 28B show the frequency characteristics of y/Um. It is apparent from FIGS. 28A and 28B that resonance appears at 200 Hz. The frequency characteristics shown are identical with the frequency characteristics of an electromagnetic microactuator. FIGS. 29A and 29B show the frequency characteristics of y/Uv. It is apparent from FIGS. 29A and 29B that the resonance of an electromagnetic microactuator appears near 200 Hz, and its antiresonance appears near 250 Hz.

In considering that the two-stage actuator is controlled by the coarse actuator only, it is understood that the phase and gain near the antiresonance frequency are largely changed. For example, in the case of intending to design a control system having a servo band near 700 Hz or 800 Hz, a phase margin cannot be ensured because of the antiresonance near 250 Hz, causing easy oscillation. It is therefore necessary to take measures against the antiresonance.

Figure 30A:
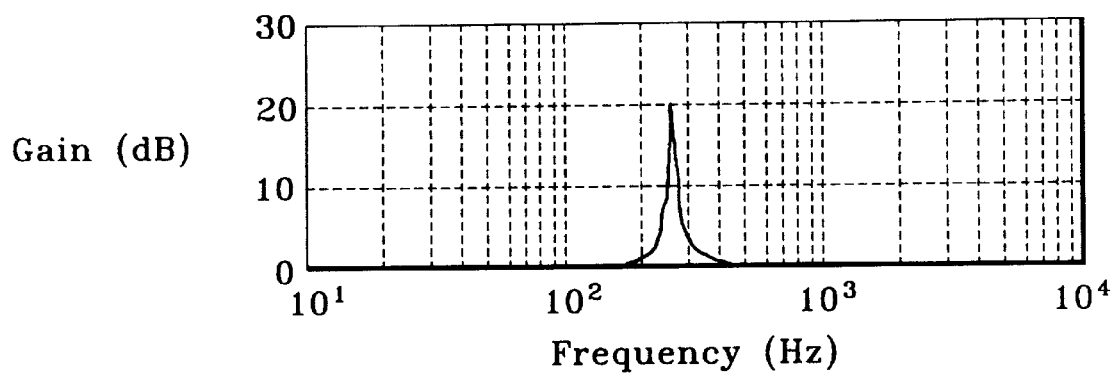
FIGS. 30A and 30B are graphs showing the frequency characteristics of an antiresonance correcting filter.
Figure 30B:
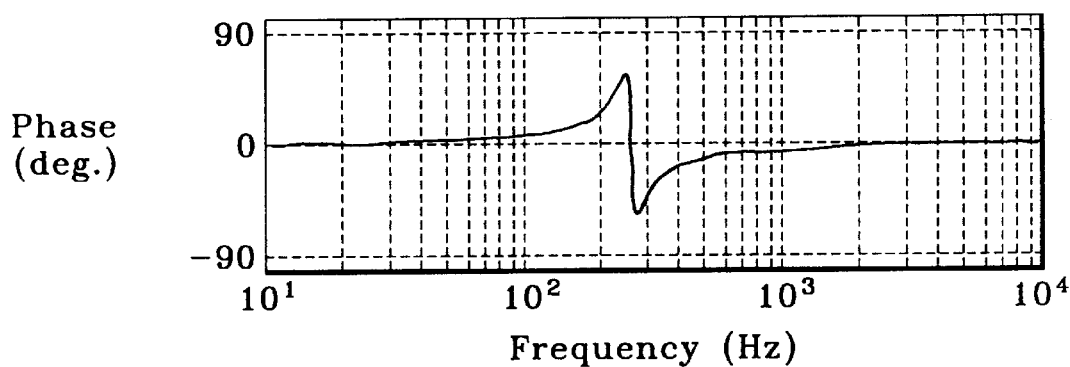
Figure 31A:
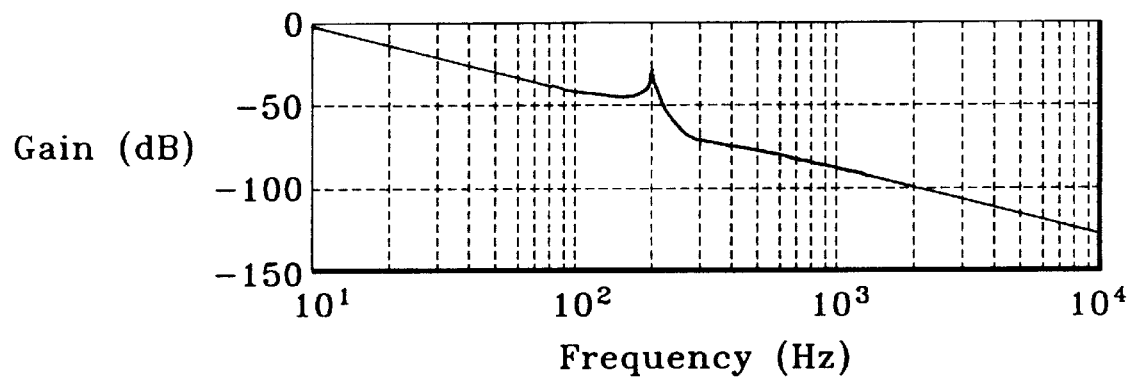
FIGS. 31A and 31B are graphs showing the frequency characteristics in the case that the antiresonance correcting filter is inserted in series with the y/Uv.
Figure 31B:
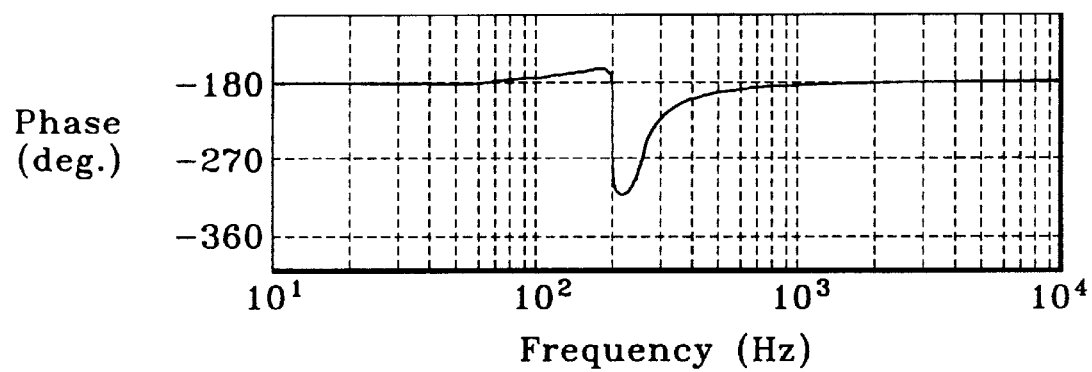

FIGS. 30A and 30B show the frequency characteristics of an antiresonance correcting filter whose poles are defined so as to cancel the effect of antiresonance. FIGS. 31A and 31B show the frequency characteristics in the case that the antiresonance correcting filter is inserted in series with the y/Uv shown in FIGS. 29A and 29B. It is understood from FIGS. 31A and 31B that although the phase changes, the gain does not rapidly fall and no oscillation occurs near the antiresonance frequency. For proper control, it is necessary to further add a filter for compensating for gain and phase, such as PI×Lead-Lag.

As another method of compensating for antiresonance, it is considered to supply to the electromagnetic microactuator a current just canceling variations in relative position of the electromagnetic microactuator due to the acceleration of the coarse actuator. In this case, however, it is necessary to remove a DC component from the antiresonance correcting current to be supplied to the electromagnetic microactuator, because the output from the electromagnetic microactuator is a relative position of the electromagnetic microactuator with respect to the coarse actuator.

According to the present invention, it is possible to provide a control system for a two-stage actuator which can freely set the ratio in servo band between the microactuator control means and the coarse actuator control means in the magnetic disk drive including the two-stage actuator, can be designed according to the properties of disturbance, properties of the microactuator, and displacements of the microactuator, and can realize high-precision stable head positioning control.

What is claimed is:

1. A control system for a two-stage actuator for a magnetic disk drive having a base, comprising:
   a rotary coarse actuator having a voice coil motor as driving means rotatably mounted on said base;
   a microactuator mounted on said coarse actuator and carrying a head at a front end portion;
   first control means for controlling driving of said coarse actuator;
   second control means for controlling driving of said microactuator; and
   feedback means for calculating a position error between a target position and an observed position of said head, and inputting said position error directly into said first and second control means;
   wherein displacement of said microactuator relative to said coarse actuator is not input into said first control means, and
   wherein a servo band of a coarse actuator control system is ⅓ or more of a servo band of said two-stage actuator control system.

2. A control system for a two-stage actuator according to claim 1, wherein said second control means has a DC gain of finite value.

3. A control system for a two-stage actuator according to claim 1, wherein said first control means includes a proportional element and an integral element and excludes a derivative element, and said second control means includes a proportional element and a derivative element and excludes an integral element.

4. A control system for a two-stage actuator according to claim 1, wherein said disk drive includes a disk on which positioning information is recorded, and said first control means includes eccentricity compensating means for compensating for a position error due to eccentricity of said disk.

5. A control system for a two-stage actuator according to claim 4, wherein said eccentricity compensating means comprises current supplying means for supplying to said coarse actuator a current large enough to make said head follow the eccentricity of said disk without delay.

6. A control system for a two-stage actuator according to claim 4, wherein said eccentricity compensating means comprises a filter having a high gain at a frequency of said eccentricity.

7. A control system for a two-stage actuator according to claim 1, wherein said microactuator comprises an electromagnetic microactuator.

8. A control system for a two-stage actuator according to claim 7, wherein said first control means includes a filter for correcting an effect of antiresonance caused by a change in relative positional relation between said microactuator and said coarse actuator due to movement of said coarse actuator.

9. A designing method for a two-stage actuator control system including a rotary coarse actuator having a voice coil motor as driving means rotatably mounted on a base of a magnetic disk drive, a microactuator mounted on said coarse actuator and carrying a head at a front end portion, first control means for controlling driving of said coarse actuator, second control means for controlling driving of said microactuator, and feedback means for calculating a position error between a target position and an observed position of said head, and inputting said position error directly into said first and second control means, wherein displacement of said microactuator relative to said coarse actuator is not input into said first control means; said designing method comprising the steps of:
   designing a transfer function of a first control system for simultaneously controlling both said coarse actuator and said microactuator;
   designing a transfer function of a second control system for controlling said coarse actuator only;
   obtaining a difference between the transfer function of said first control system and the transfer function of said second control system; and
   multiplying said difference by reverse characteristics of said microactuator to obtain characteristics of said second control means.

10. A designing method for a two-stage actuator control system including a rotary coarse actuator having a voice coil motor as driving means rotatably mounted on a base of a magnetic disk drive, a microactuator mounted on said coarse actuator and carrying a head at a front end portion, first control means for controlling driving of said coarse actuator, second control means for controlling driving of said microactuator, and feedback means for calculating a position error between a target position and an observed position of said head, and inputting said position error directly into said first and second control means, wherein displacement of said microactuator relative to said coarse actuator is not input into said first control means; said designing method comprising the steps of:

designing a transfer function of a first control system for simultaneously controlling both said coarse actuator and said microactuator;

designing a transfer function of a second control system for controlling said coarse actuator only;

obtaining a difference between the transfer function of said first control system and the transfer function of said second control system; and multiplying said difference by reverse characteristics of said coarse actuator to obtain characteristics of said first control means.

\* \* \* \* \*